(12) United States Patent
Sawai et al.

(10) Patent No.: US 8,990,012 B2
(45) Date of Patent: Mar. 24, 2015

(54) MAP UPDATE DATA SUPPLY DEVICE AND MAP UPDATE DATA SUPPLY PROGRAM

(75) Inventors: Kimiyoshi Sawai, Okazaki (JP); Kazunori Watanabe, Okazaki (JP); Takayuki Watanabe, Kariya (JP); Yasutaka Atarashi, Kariya (JP)

(73) Assignees: Aisin AW Co., Ltd., Anjo (JP); Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 41 days.

(21) Appl. No.: 13/635,143

(22) PCT Filed: Mar. 7, 2011

(86) PCT No.: PCT/JP2011/055863
§ 371 (c)(1),
(2), (4) Date: Sep. 14, 2012

(87) PCT Pub. No.: WO2011/118422
PCT Pub. Date: Sep. 29, 2011

(65) Prior Publication Data
US 2013/0006925 A1  Jan. 3, 2013

(30) Foreign Application Priority Data
Mar. 23, 2010 (JP) .................... 2010-066735

(51) Int. Cl.
*G08G 3/00* (2006.01)
*G01C 21/32* (2006.01)
*G06F 17/30* (2006.01)

(52) U.S. Cl.
CPC .......... *G01C 21/32* (2013.01); *G06F 17/30241* (2013.01)
USPC ........................................ 701/450; 707/758

(58) Field of Classification Search
CPC ............ Y10S 707/918; Y10S 707/919; Y10S 707/92; Y10S 707/921; Y10S 116/43; G08G 1/0967; G08G 1/0968; G08G 1/0969; G08G 1/123; G08G 3/00
See application file for complete search history.

(56) References Cited

U.S. PATENT DOCUMENTS 6,330,453 B1 * 12/2001 Suzuki et al. .................. 455/457
7,490,006 B2    2/2009 Sekine et al.
(Continued)

FOREIGN PATENT DOCUMENTS

DE    10 2005 029 744 A1    12/2006
EP         1 691 168 A1     8/2006
(Continued)

OTHER PUBLICATIONS

International Preliminary Report on Patentability issued in Application No. PCT/JP2011/055863; Dated Jun. 27, 2012.
(Continued)

*Primary Examiner* — Augustine K Obisesan
(74) *Attorney, Agent, or Firm* — Oliff PLC

(57) ABSTRACT

A map update data supply device includes: a request update data extraction unit that based on an update request extracts a request update section, and a latest version of an overwrite update data file for overwrite updating; and a safeguard update data extraction unit that extracts a safeguard update section that safeguards a network between adjacent sections, and up to an update safeguard version of a difference update data file, wherein the extracted data files are supplied to a navigation device.

7 Claims, 20 Drawing Sheets

(56) References Cited

U.S. PATENT DOCUMENTS

| | | | |
|---|---|---|---|
| 2002/0091485 A1* | 7/2002 | Mikuriya et al. | 701/208 |
| 2003/0028315 A1* | 2/2003 | Miyahara | 701/208 |
| 2004/0196163 A1* | 10/2004 | Takenaga et al. | 340/995.12 |
| 2005/0021510 A1* | 1/2005 | Uchida et al. | 707/3 |
| 2006/0095202 A1* | 5/2006 | Atarashi et al. | 701/208 |
| 2007/0109303 A1* | 5/2007 | Muramatsu | 345/440 |
| 2007/0126605 A1 | 6/2007 | Aleksic et al. | |
| 2007/0143014 A1* | 6/2007 | Sekine et al. | 701/211 |
| 2007/0244636 A1* | 10/2007 | Horikami | 701/208 |
| 2007/0282524 A1* | 12/2007 | Tanizaki et al. | 701/208 |
| 2008/0086262 A1* | 4/2008 | Asahara et al. | 701/208 |
| 2008/0147305 A1* | 6/2008 | Kawamata et al. | 701/117 |
| 2008/0208452 A1* | 8/2008 | Stocker | 701/201 |
| 2008/0228712 A1* | 9/2008 | Nomura | 707/3 |
| 2009/0248758 A1 | 10/2009 | Sawai et al. | |
| 2009/0292458 A1* | 11/2009 | Nakamura et al. | 701/200 |
| 2010/0274472 A1* | 10/2010 | Sakai et al. | 701/200 |
| 2011/0106431 A1* | 5/2011 | Tomobe et al. | 701/201 |
| 2011/0137546 A1* | 6/2011 | Roesser et al. | 701/200 |
| 2012/0120944 A1* | 5/2012 | Yang et al. | 370/350 |

FOREIGN PATENT DOCUMENTS

| | | |
|---|---|---|
| EP | 1 788 353 A1 | 5/2007 |
| EP | 1 909 068 A2 | 4/2008 |
| JP | A-2002-181552 | 6/2002 |
| JP | A-2004-178248 | 6/2004 |
| JP | A-2005-077642 | 3/2005 |
| JP | A-2006-251768 | 9/2006 |
| JP | A-2007-241003 | 9/2007 |
| JP | A-2008-089852 | 4/2008 |
| WO | WO 2008044584 A1 * | 4/2008 |

OTHER PUBLICATIONS

International Search Report issued in Application No. PCT/JP2011/055863; Dated Jul. 4, 2011.

Japanese Patent Office, Notification of Reason(s) for Refusal mailed May 16, 2013 in Japanese Patent Application No. 2010-066735 w/Partial English-language Translation.

* cited by examiner

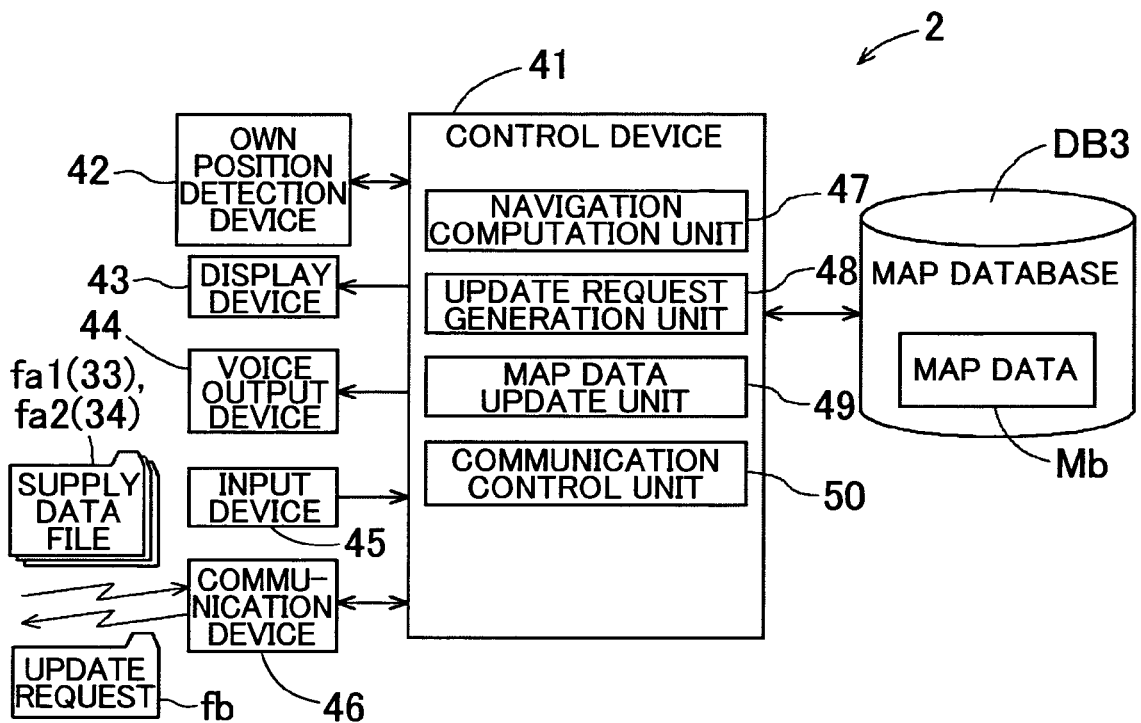

| VERSION TABLE | | ~VT |
|---|---|---|
| SECTION ID | LATEST VERSION | |
| A1 | 6 | |
| A2 | 6 | |
| A3 | 4 | |
| A4 | 3 | |
| ⋮ | ⋮ | |

FIG. 6

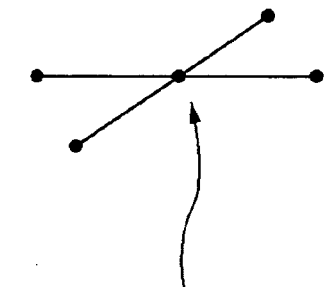

| DATA SIZE | FORMAT |
|---|---|
| | ROAD DATA |
| | DELETION { |
| 4 | ROAD ID |
| | } |
| | ADDITION { |
| 4 | ROAD ID |
| 1 | ROAD TYPE |
| 4 | START POINT INTERSECTION ID |
| 4 | END POINT INTERSECTION ID |
| 2 | VARIOUS FLAGS |
| 2 | EXTENSION DATA YES/NO FLAG |
| 2 | ROAD LENGTH |
| 4 | CLASSIFICATION, WIDTH, ETC. |
| 1 | ONE-WAY FLAG |
| | } |
| | MODIFICATION { |
| 4 | ROAD ID |
| 1 | UPDATE YES/NO FLAG { |
| bit6 | YES/NO FLAG FOR ONE-WAY FLAG |
| bit5 | YES/NO FLAG FOR CLASSIFICATION, WIDTH, ETC. |
| bit4 | YES/NO FLAG FOR ROAD LENGTH |
| bit3 | YES/NO FLAG FOR EXTENSION DATA YES/NO FLAG |
| bit2 | YES/NO FLAG FOR VARIOUS FLAGS |
| bit1-0 | ROAD TYPE |
| | } |
| 2 | VARIOUS FLAGS |
| 2 | EXTENSION DATA YES/NO FLAG |
| 2 | ROAD LENGTH |
| 4 | CLASSIFICATION, WIDTH, ETC. |
| 1 | ONE-WAY FLAG |
| | } |

ROAD DELETION, ADDITION, MODIFICATION DATA SIZES
- DELETION: ID (4 BYTES)= 4 BYTES
- ADDITION: ID (4 BYTES)+ ATTRIBUTES (20 BYTES)= 24 BYTES
- MODIFICATION: ID (4 BYTES) +ATTRIBUTES (12 BYTES)= 16 BYTES

F I G . 7

| MANAGEMENT DATA TABLE | | ~ DT |
|---|---|---|
| NAVIGATION DEVICE ID, LATEST SUPPLY DATE | | |
| SECTION ID | CURRENT VERSION | |
| A1 | 4 | |
| A2 | 4 | |
| A3 | 3 | |
| A4 | 3 | |
| ⋮ | ⋮ | |

FIG. 9A
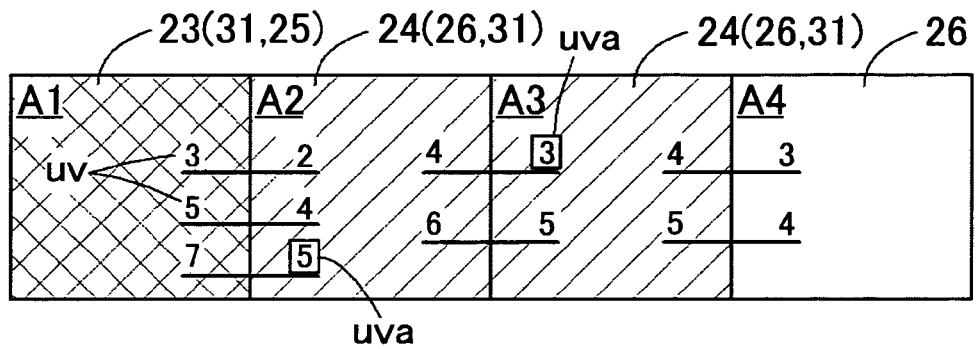
FIG. 9B
| SECTION ID | CURRENT VERSION | LATEST VERSION |
|---|---|---|
| A1 | 1 | 8 |
| A2 | 1 | 6 |
| A3 | 2 | 6 |
| A4 | 2 | 5 |
FIG. 9C
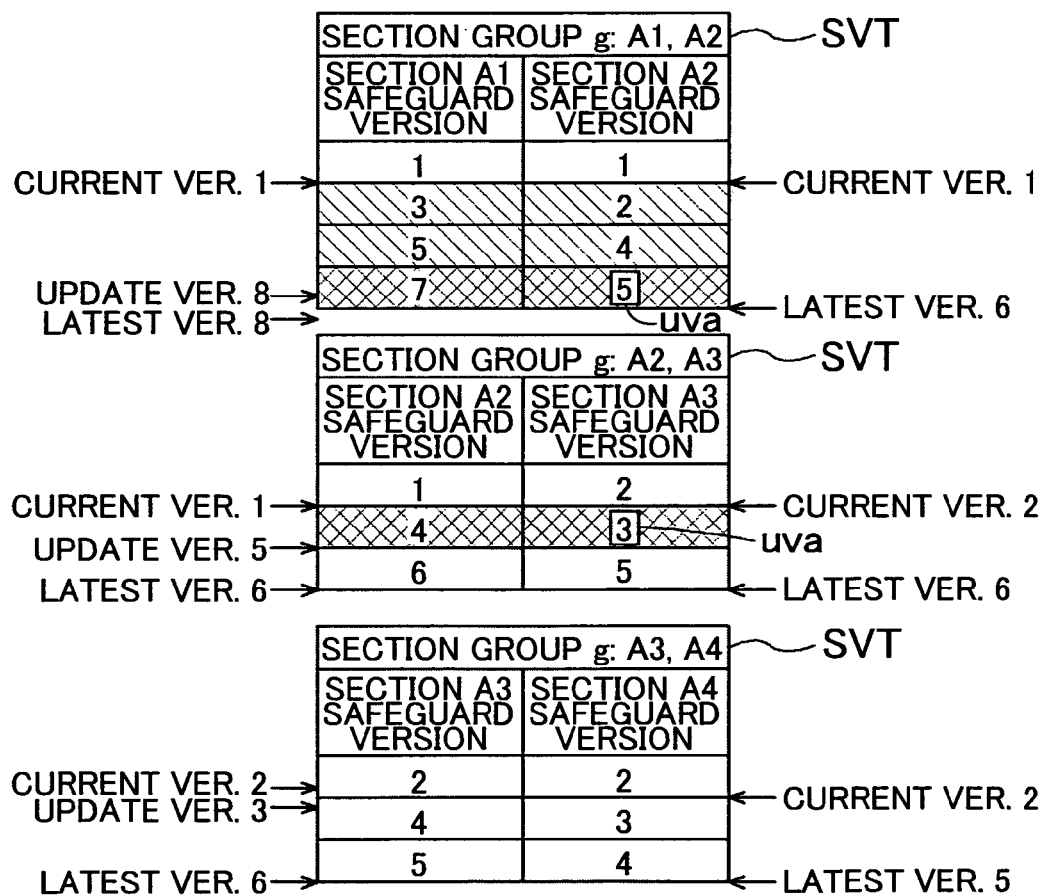

FIG. 11

CASE 1: ADDITION ULTIMATELY DELETED

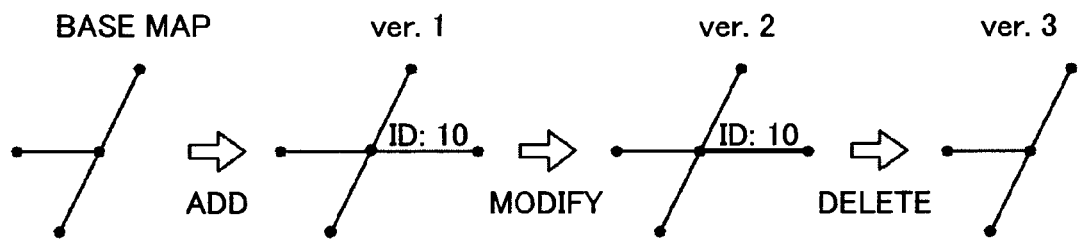

<WITHOUT INTEGRATION>

VER. 1: ROAD ADDITION
→ ID (4 BYTES)+ATTRIBUTES (20 BYTES) SUPPLIED

VER. 2: ATTRIBUTE MODIFICATION
→ ID (4 BYTES)+ATTRIBUTES (12 BYTES) SUPPLIED

VER. 3: ROAD DELETION
→ ID (4 BYTES) SUPPLIED

⇩

UPDATE DATA FOR 3 DIFFERENCE UPDATES SUPPLIED (44 BYTES TOTAL)

⇒

<WITH INTEGRATION>

AFTER ADDITION OF ROAD WITH ID: 10, THIS ROAD IS ULTIMATELY DELETED, SO NO UPDATE DATA RELATED TO ROAD OF ID: 10 IS SUPPLIED

⇩

NO UPDATE DATA (0 BYTES)

F I G . 12

| VERSION / CASE | ver. 1 ADDITION | ver. 2 MODIFI-CATION | ver. 3 MODIFI-CATION | ver. 4 DELETION | WITHOUT INTEGRATION NUMBER OF UPDATES | WITHOUT INTEGRATION TOTAL DATA SIZE | WITH INTEGRATION UPDATE CONTENT | WITH INTEGRATION NUMBER OF UPDATES | WITH INTEGRATION TOTAL DATA SIZE |
|---|---|---|---|---|---|---|---|---|---|
| 1 | O | O | — | O | 3 | 44 | — | 0 | 0 |
| 2 | O | O | O | O | 4 | 60 | — | 0 | 0 |
| 3 | O | — | — | O | 2 | 28 | — | 0 | 0 |
| 4 | — | O | — | O | 2 | 20 | DELETION | 1 | 4 |
| 5 | — | O | O | O | 3 | 36 | DELETION | 1 | 4 |
| 6 | — | — | — | O | 1 | 4 | DELETION | 1 | 4 |
| 7 | — | O | — | — | 1 | 16 | MODIFI-CATION | 1 | 16 |
| 8 | — | O | O | — | 2 | 32 | MODIFI-CATION | 1 | 16 |
| 9 | O | O | — | — | 2 | 40 | ADDITION | 1 | 24 |
| 10 | O | O | O | — | 3 | 56 | ADDITION | 1 | 24 |
| 11 | O | — | — | — | 1 | 24 | ADDITION | 1 | 24 |
|  |  |  |  |  | 24 | 360 | — | 8 | 116 |

SIZE(byte)

F I G . 14
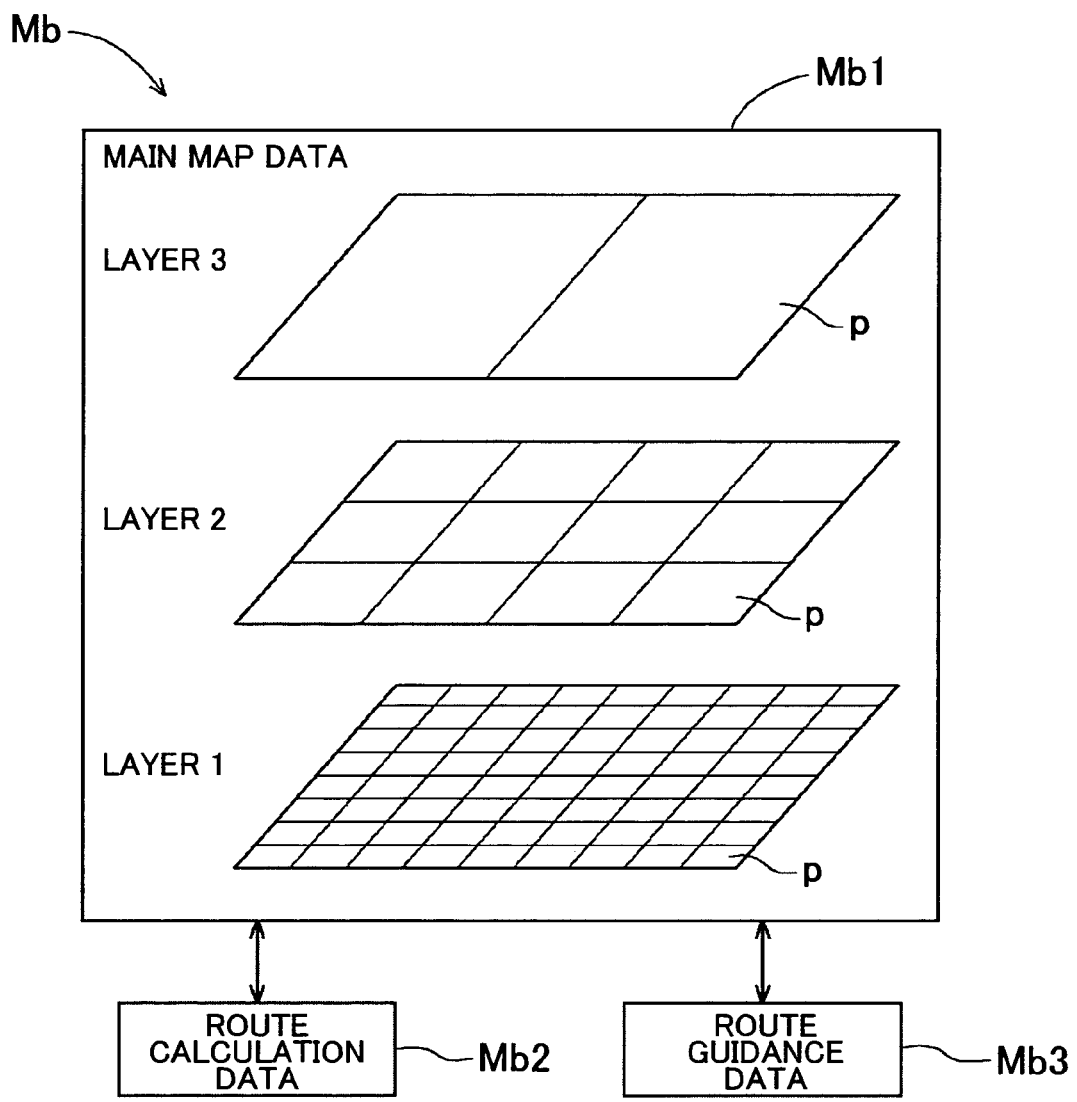

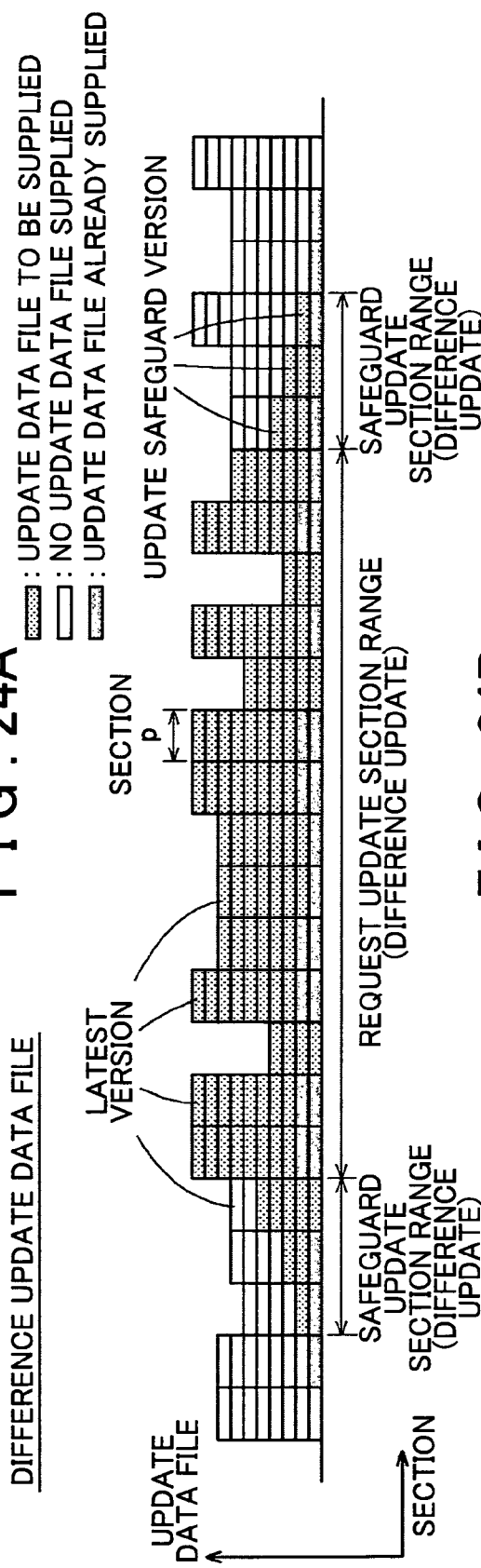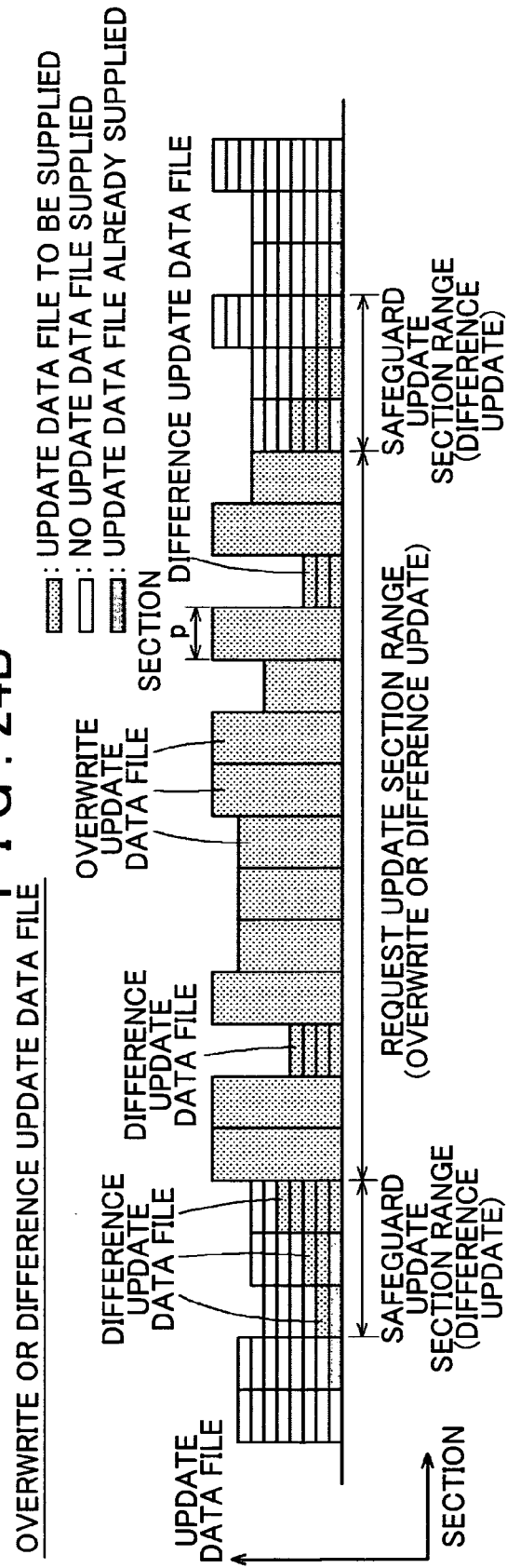

MAP UPDATE DATA SUPPLY DEVICE AND MAP UPDATE DATA SUPPLY PROGRAM

FIELD OF THE INVENTION

The present invention relates to a map update data supply device and a map update data supply program, which supply data for updating map data to a navigation device having map data.

DESCRIPTION OF THE RELATED ART

Heretofore known art partially updates the content of map data for a road map or the like that is used by a navigation device. For example, in order to maintain a newly built road up to portions that connect to existing main roads as one data group, a device described in Japanese Patent Application Publication No. JP-A-2004-178248 includes a data group table that stores a series of link members that constitute the new road. The navigation device may request an update of some sections of map data that is divided into a plurality of sections. At such time, if the new road stored in the data group table also extends into other sections besides those for which an update is requested, update information of the new road is fully provided to the navigation device by referring to the data group table.

A break in a road between adjacent sections can thus be prevented, even when update information is provided for only some sections of map data as specified by the navigation device. Therefore, even after an update of only some sections, a route search can be appropriately performed and the appearance of a map display can also be improved.

SUMMARY OF THE INVENTION

According to the device described in JP-A-2004-178248, the data group table is configured so as to store a series of link members that constitute a new road. However, for example, if there are many new roads or a new road extends for a long distance, the quantity of information for the link members registered in the data group table and the like grows larger, and the volume of data in the data group table also increases.

Further, since the data group table is configured to store a series of link members that constitute a new road, when a pre-existing road changes in relation to the new road in a section other than the section for which an update is requested, an appropriate update cannot be performed regarding the changed location. As a consequence, a connection relationship between the new road and the pre-existing road may not be correct, and could result in an inability to appropriately perform a route search or other operation.

In order to reduce the volume of update data supplied to the navigation device, a configuration may be used in which only difference update data regarding a changed location is supplied for map data included in the navigation device. In such case, if update data for a road extending into a section other than the section for which an update is requested spans a plurality of versions of difference update data, it is difficult to generate the data group table mentioned above.

In addition, when supplying difference update data, a plurality of versions of difference update data may also be transmitted for the same section. In such case, transmitting the plurality of versions of difference update data without modification will result in duplicate data among the different versions being supplied. Consequently, the volume of data supplied increases and the processing load of the navigation device also increases accordingly due to the duplicate update processing performed.

It is thus desirable to realize a map update data supply device and a map update data supply program which safeguard a road network connection between a section to be updated and another section when a difference update of map data in a navigation device is performed, and also reduce the time and processing load required for updating map data.

In order to achieve the above object, a map update data supply device according to the present invention supplies data for updating a map database to a navigation device that has the map database, with the map database including at least road network information and divided into a plurality of sections. The map update data supply device is characterized by including: an update map database that manages per section versions of an update data file of the map database, and stores per section an overwrite update data file that is an update data file for overwrite updating to a latest version and a difference update data file that an update data file for difference updating to a particular version; a request update data extraction unit that, based on an update request from the navigation device, extracts a request update section that is a section subjected to an overwrite update, and extracts for each request update section the overwrite update data file as a first supply data file that is a data file to be supplied to the navigation device; a safeguard update data extraction unit that, if all the request update sections are updated by the overwrite update data file, extracts a safeguard update section that is a section requiring a difference update to safeguard a road network connection between adjacent sections, and extracts for each safeguard update section the difference update data file up to an update safeguard version, which is a version requiring a difference update to safeguard the road network connection, as a second supply data file that is a data file to be supplied to the navigation device; and a data supply unit that supplies to the navigation device the first supply data file for each request update section extracted by the request update data extraction unit, and the second supply data file for each safeguard update section extracted by the safeguard update data extraction unit.

According to this characteristic configuration, a latest version of an overwrite update data file for a request update section can be supplied to a navigation device. In addition, a safeguard update section and an update safeguard version that require updating to safeguard a road network connection between adjacent sections in a request update section range can be extracted and supplied to the navigation device.

It is thus possible to resolve road network connection discontinuity between adjacent sections around the request update section, which occurs from updating the map database with respect to the request update section, and the road network connection can be safeguarded. At such time, to update the safeguard update section, the update data file up to the update safeguard version that needs updating to safeguard the road network is extracted and supplied instead of up to the latest version of the update data file. Therefore, the update safeguard version becomes increasingly older than the latest version the farther the section is from the request update section range, and the section range in which the safeguard update sections spread out in a chain manner can thus be narrowed. Consequently, the number of versions that pertain to updating the safeguard update section ranges and the safeguard update sections can be kept to the minimum required. In addition, the volume of update data for network safeguarding can be suppressed and the update time can also be reduced.

Even if there are many versions that pertain to the update of the request update section, the volume of data to be supplied does not significantly fluctuate and the data distribution time can be stabilized because the latest version of the overwrite update data file for the request update section is supplied. This is because the overwrite update data file includes all data constituting the map data of the section and there is little fluctuation in the volume of data compared to difference data. In addition, an update of the map data in the navigation device is simply executed by performing processing that uses the supplied overwrite update data file for the section to replace (overwrite update) the map data of the corresponding section. Therefore, compared to processing for difference updating that successively determines update content per data unit and rewrites the map data, the update processing time within the navigation device can be considerably shortened. In particular, when there are many versions of data to be supplied, the overwrite update processing time is short and stabilized in contrast to the difference update processing time that considerably increases.

Accordingly, the update time for updating the map data in the navigation device when the overwrite update data file is supplied for the request update section does not considerably increase compared to when difference update data is supplied, and can remain stable. Thus, the map update of the navigation device can have enhanced user-friendliness, and the system design of the map data supply system can be simplified.

Here, a configuration is preferred in which the request update data extraction unit extracts up to the latest version of the difference update data file for each request update section; an update time determination unit is further provided that compares the overwrite update data file and up to the latest version of the difference update data file for each request update section to determine which carries a shorter update time; and the request update data extraction unit, if the update time determination unit determines that the update time carried by up to the latest version of the difference update data file is shorter than the update time carried by the overwrite update data file, extracts for the request update section up to the latest version of the difference update data file in place of the overwrite update data file as the first supply data file.

According to this characteristic configuration, the overwrite update data file and the difference update data file for each request update section are compared based on a prescribed index related to update time, and either the overwrite update data file or the difference update data file is extracted and supplied so as to shorten the time for updating the map data in the navigation device. Therefore, a shortened update time for each section can be achieved, which leads to an even shorter update time overall.

For example, the difference update data file is extracted for the request update section that has a small number of versions pertaining to updating, thus suppressing an increase in the update processing time of the navigation device and reducing the distribution time. Consequently, the update time overall can be shortened. In addition, extraction as a difference update is possible in cases when there are few versions pertaining to updating over all the request update sections, such as when there is a short interval between the previous update data supply time and the current supply time. Therefore, the update time can be shortened.

It should be noted that instead of making a determination strictly in terms of time, a determination may be made using an index that also takes into account indices such as the economy and convenience related to update time. Such a determination would enable improved economy and convenience of the update data supply device, as well as greater user satisfaction.

Here, a configuration is preferred in which the data supply unit comprises at least two selectable data supply methods whose communication costs differ depending on a volume of data; and the request update data extraction unit, if the data supply method with the higher communication cost is selected, extracts up to the latest version of the difference update data file in place of the overwrite update data file as the first supply data file.

According to this characteristic configuration, if the data supply method with the higher communication cost depending on the volume of data is selected, the difference update data file with a relatively small volume of data to be supplied to the navigation device can be supplied, thus giving priority to enhancing economy.

Here, a configuration is preferred in which an integrated data generation unit is further provided that integrates per request update section up to the latest version of all the difference update data files for each request update section extracted by the request update data extraction unit, and generates a request update integrated data file that serves as a data file for one difference update; the update time determination unit performs processing such that an update time carried by the request update integrated data file is used for comparison in place of up to the latest version of the difference update data file; and the request update data extraction unit performs processing such that the request update integrated data file is extracted in place of up to the latest version of the difference update data file as the first supply data file.

According to this characteristic configuration, the update data files for difference updating to a plurality of versions up to the latest version for each request update section are integrated per request update section to generate a data file for one difference update. In place of up to the latest version of the difference update data file, this integrated data file is used for comparison in terms of update time and supplied. Therefore, compared to supplying a plurality of versions of the difference update data file unchanged, the volume of data and the number of difference update data files to be supplied can be reduced. Consequently, the distribution time and the update processing time within the navigation device can be shortened.

Here, a configuration is preferred in which an integrated data generation unit is further provided that integrates up to the update safeguard version of all the difference update data files for each safeguard update section extracted by the safeguard update data extraction unit, and generates a safeguard update integrated data file that serves as a data file for one difference update; and the safeguard update data extraction unit extracts the safeguard update integrated data file in place of up to the update safeguard version of all the difference update data files as the second supply data file.

According to this characteristic configuration, the update data files for difference updating to a plurality of versions up to the update safeguard version for each safeguard update section are integrated per safeguard update section to generate a data file for one difference update. In place of up to the update safeguard version of the difference update data file, this integrated data file is supplied to the navigation device. Therefore, compared to supplying a plurality of versions of the difference update data file unchanged, the volume of data and the number of difference update data files to be supplied can be reduced. Consequently, the distribution time and the update processing time within the navigation device can be shortened.

Here, a configuration is preferred in which a version table is further provided that stores, as a safeguard version and associated with a section group that is a combination of a section and a section adjacent thereto in the update map database, a version of the difference update data file for a section when safeguarding of a road network connection between the sections that constitute the section group is required; and the safeguard update data extraction unit extracts the safeguard update section based on the version table, the request update section and the latest version of the request update section, and acquires information on the update safeguard version for each safeguard update section to extract up to the update safeguard version of the difference update data file.

According to this characteristic configuration, the safeguard version table used stores the safeguard version information as associated with the section group. Therefore, simple processing that searches the safeguard version table can be used to extract the safeguard update section and the update safeguard version. Thus, the computation load of the update data supply device can be reduced, and a shorter update data supply time and a lower cost update data supply device can also be achieved.

A map update data supply program according to the present invention supplies data for updating a map database to a navigation device that has the map database, with the map database including at least road network information and divided into a plurality of sections. The map update data supply program is characterized by executing in a computer the steps of: using an update map database that manages per section versions of an update data file of the map database, and stores per section an overwrite update data file that is an update data file for overwrite updating to a latest version and a difference update data file that an update data file for difference updating to a particular version; extracting, based on an update request from the navigation device, a request update section that is a section subjected to an overwrite update, and extracting for each request update section the overwrite update data file as a first supply data file that is a data file to be supplied to the navigation device; extracting, if all the request update sections are updated by the overwrite update data file, a safeguard update section that is a section requiring a difference update to safeguard a road network connection between adjacent sections, and extracting for each safeguard update section the difference update data file up to an update safeguard version, which is a version requiring a difference update to safeguard the road network connection, as a second supply data file that is a data file to be supplied to the navigation device; and supplying to the navigation device the first supply data file for each request update section extracted by the request update data extraction unit, and the second supply data file for each safeguard update section extracted by the safeguard update data extraction unit.

According to this characteristic configuration, a latest version of an overwrite update data file for a request update section can be supplied to a navigation device. In addition, a safeguard update section and an update safeguard version that require updating to safeguard a road network connection between adjacent sections in a request update section range can be extracted and supplied to the navigation device.

It is thus possible to resolve road network connection discontinuity between sections adjacent to the request update section, and the road network connection can be safeguarded. To update the safeguard update section, an update safeguard version that is at least older than the latest version is extracted and supplied. Therefore, the section range in which the safeguard update sections spread out in a chain manner can be narrowed, and the safeguard update section ranges and the number of versions pertaining to updating can be kept to the minimum required. Consequently, the volume of update data for network safeguarding can be suppressed and the update time can also be reduced.

Regardless of increases or decreases in the number of versions that pertain to updating the request update section, the update time for updating that includes the distribution time and the update processing time within the navigation device can be stabilized because the latest version of the overwrite update data file for the request update section is supplied. In addition, an update of the map data in the navigation device is simply executed by performing processing that uses the supplied overwrite update data file for the section to replace (overwrite update) the map data of the corresponding section. Therefore, compared to difference update processing, the update processing time within the navigation device can be considerably shortened.

Thus, the map update of the navigation device can have enhanced user-friendliness, and the system design of the map data supply system can be simplified.

BRIEF DESCRIPTION OF THE DRAWINGS

FIG. 2 is a block diagram of a navigation device according to the embodiment of the present invention;

FIG. 3 is an explanatory drawing for explaining the constitution of update map data;

FIG. 6 is a drawing that shows an example of a data format of update data;

FIG. 7 is a drawing that shows an example of a management data table;

FIGS. 9A, 9B, and 9C are explanatory drawings for explaining an extraction method of a safeguard update section and an update safeguard version;

FIG. 11 shows explanatory drawings for explaining a generation method of an integrated data file;

FIG. 12 is an explanatory drawing for explaining the generation method of the integrated data file;

FIG. 14 is a drawing for explaining map data included in the navigation device;

FIGS. 24A and 24B are explanatory drawings for explaining an operation and effect of the embodiment of the present invention.

DETAILED DESCRIPTION OF THE EMBODIMENTS

First Embodiment

Figure 1:
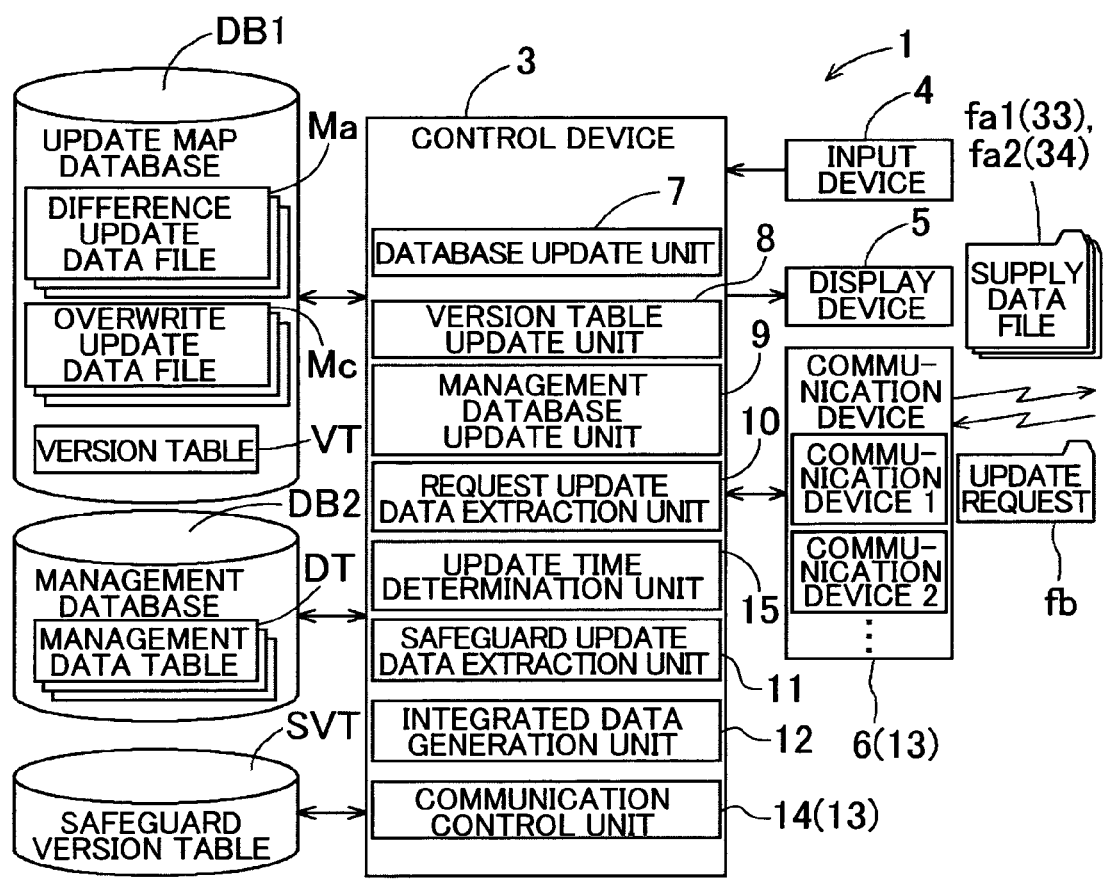
FIG. 1 is a block diagram of a map update data supply device according to an embodiment of the present invention.

A first embodiment of the present invention will be described on the basis of the drawings. FIG. 1 is a block diagram that schematically shows the constitution of a map update data supply device 1 according to the present embodiment. FIG. 2 is a block diagram that schematically shows the constitution of a navigation device 2 according to the present embodiment. In the present embodiment, the map update data supply device 1 and the navigation device 2 include communication devices 6, 46, respectively, and are connected in a manner that allows the transmission and reception of data through various types of communication networks. The map update data supply device 1 and the navigation device 2 configure a map data update system overall. The map update data supply device 1 supplies to the navigation device 2 a supply data file fa for overwrite or difference updating a map database DB3. The navigation device 2 that received the supply data file fa updates the map database DB3 on the basis of the supply data file fa. The constitutions of the map update data supply device 1 and the navigation device 2 according to the present embodiment will be explained in detail below.

1. Navigation Device 2

As shown in FIG. 2, the navigation device 2 includes the map database DB3, a control device 41, an own position detection device 42, a display device 43, a voice output device 44, an input device 45, and the communication device 46. The control device 41 includes a navigation computation unit 47, an update request generation unit 48, a map data update unit 49, and a communication control unit 50. Here, the navigation computation unit 47 implements basic guidance functions of the navigation device 2. Basic guidance functions of the navigation device 2 include functions such as displaying a surrounding map of the own position or a specified position, calculating a route from a departure point to a destination, providing route guidance to a destination, performing map matching to correct the own position on a road, and searching for a destination. The control device 41 of the navigation device 2 is configured to include computational processing devices such as a CPU, and a storage medium such as a RAM or a ROM for storing software (programs), data, and the like. Each unit 47 to 50 included in the control device 41 has as its core member a computational processing device of the control device 41. Each functional portion for performing various types of processing on data that is input can be implemented by one of hardware, software, and both hardware and software. In addition, the map database DB3 may be stored in a rewritable storage medium such as a hard disk drive or a flash memory, for example.

The navigation device 2 includes a map data update program that is a program for updating map data. The map data update program has steps that correspond to processes performed by the units included in the navigation device 2. The map data update program causes the computational processing devices (computers) included in the navigation device 2 to execute each step, whereby each process is executed. Although it may not be especially noted in the following descriptions, the map data update program has steps that correspond to the processes performed by the navigation device 2. The constitutions of the respective parts of the navigation device 2 will be described below in succession.

1-1. Map Database DB3

The map database DB3 stores map data Mb, which is map data for navigation purposes to be referenced by the navigation computation unit 27 in order to realize guidance functions of the navigation device 2.

Figures 4, 5:
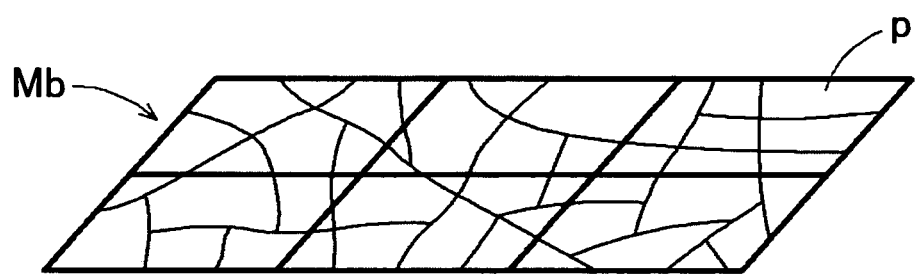
FIG. 4 is a drawing that shows an example of a version table.
FIG. 5 is a drawing for explaining map data included in the navigation device.

The map data Mb within the map database DB3 has as its applicable range of map data an entire area within which navigation is performed (e.g. all of Japan). The map data Mb is divided into m×n (m and n being natural numbers) to form sections p. In the present embodiment, as shown in FIG. 3, the sections p are set as rectangles of an identical size. The map database DB3 of the navigation device 2 has information on various types of objects; for example, the layout and form of roads, intersections, and paint markers and traffic signals provided along roads, as well as structures such as buildings (residential, office, etc.), bridges and tunnels, natural objects such as rivers and coastlines, and administrative districts. A difference update data file Ma that will be described later is a data file for difference updating the information within the map database DB3. An overwrite update data file Mc that will be described later is a data file for overwrite updating. The overwrite update data file Mc includes map data in the same format as the map data Mb, and similar to the map data Mb, includes all data constituting a map within a section. FIG. 5 is an explanatory drawing for explaining the content of information included the map database DB3. Note that objects other than roads and intersections are omitted in FIG. 5. As shown in FIG. 5, the map data Mb within the map database DB3 has information on objects such as a plurality of roads and the like that exist within each section p and span between a plurality of sections p. It should be noted that, although not shown in the drawing, the map data Mb also has information on various types of objects other than roads, and these objects may span between adjacent sections p. For the purposes of simplifying the description below, information on the especially critical "road" among the various types of objects mentioned above will be used as an example of the content of map data supplied to the navigation device 2.

The map data Mb of the map database DB3 for each section p in the navigation device 2 is constituted from a set of a plurality of data units DU respectively associated with identification codes. Various types of data are included in the map data Mb, such as road data, intersection data, restriction data, guidance data, connection data, and branch guidance data. The plurality of data units DU associated with identification codes are constituted per data type.

FIG. 14 is an explanatory drawing for explaining the constitution of the map data Mb stored in the map database DB3. As shown in FIG. 14, the map data Mb includes main map data Mb1, route calculation data Mb2, and route guidance data Mb3. Here, the main map data Mb1 is divided into a plurality of layers in accordance with the level of detail of stored information on objects such as roads. In the present example, the main map data Mb1 in order from bottom to top has three layers, a layer 1, a layer 2, and a layer 3. A lower layer here includes more detailed information on objects such as roads. Each layer of the main map data Mb1 is divided into a plurality of sections p. In this case, a higher layer is set with sections p that correspond to a wider area. Therefore, one section p of a higher layer includes an area that corresponds to a plurality of sections p of a lower layer. Each layer of the main map data Mb1 includes information on a road network that is constituted from a plurality of links (roads) and a plurality of nodes (intersections). The main map data Mb1 is referenced by the navigation computation unit 27 when displaying a surrounding map of the own position or a specified position, performing map matching to correct the own position on the road, and the like.

The route calculation data Mb2 is associated with the main map data Mb1, and has information on the cost, travel requirements, node correspondence relationships with a higher layer, and the like for each link constituting the road network. The route calculation data Mb2 is referenced by the navigation computation unit 27 when calculating a route from a departure point to a destination. The route guidance data Mb3 is associated with the main map data Mb1, and has information on images, speech, and the like required when providing route guidance from a departure point to a destination. Accordingly, the route guidance data Mb3 is referenced by the navigation computation unit 27 when providing route guidance to a destination.

As described above, in the main map data Mb1 of the map data Mb, the size of the real-world area corresponding to one section p differs depending on the layer. In the present example, the size of the real-world area included in each section p of the layer 1 in the main map data Mb1 corresponds to the size of the area of each section p in the difference update data file Ma and the overwrite update data file Mc. Therefore, a first supply data file fa1 and a second supply data file fa2 supplied by the map update data supply device 1 are data files in units of sections that correspond to the section p of the layer 1 in the main map data Mb1. Based on the layer 1 data in the main map data Mb1 after overwrite or difference updating on the basis of the first supply data file fa1 and the second supply data file fa2, the layers 2 and 3 in the main map data Mb1 as well as the route calculation data Mb2 and the route guidance data Mb3 are generated and updated by the map data update unit 49.

1-2. Own Position Detection Device 42

The own position detection device 42 detects the current position of the navigation device 2. Therefore, although not shown in the drawings, the own position detection device 42 is configured to include a GPS receiver, a heading sensor, and a distance sensor, for example. Based on information acquired from these, the own position detection device 42 acquires information on coordinates, a direction of travel, and the like that indicate the current position, and outputs such information to the control device 41. In the control device 41, based on the map data Mb and own position information detected by the own position detection device 42, the navigation computation unit 47 executes processing to display the own position, perform map matching, and the like.

1-3. Display Device 43, Voice Output Device 44, Input Device 45, and Communication Device 46

The display device 43 is configured to include a liquid crystal display. The voice output device 44 is configured to include a speaker and an amplifier. The display device 43 and the voice output device 44 are controlled and operated by the navigation computation unit 47, and respectively output a display and speech for displaying the own position, calculating a route between two points, providing route guidance, searching for a destination, and the like. The input device 45 is configured to include a touch panel that is integrated with the display device 43, operation switches, and a remote controller. The input device 45 accepts operational input from a user, and outputs the content of such operational input to the control device 41. The communication device 46 has a configuration that enables communication with and the transmission and reception of data to and from the communication device 6 of the map update data supply device 1 through various types of known wired or wireless communication networks.

1-4. Control Device 41

As mentioned above, the control device 41 includes the navigation computation unit 47, the update request generation unit 48, the map data update unit 49, and the communication control unit 50. The navigation computation unit 47, as described earlier, implements basic guidance functions of the navigation device 2 such as displaying a surrounding map of the own position or a specified position, calculating a route from a departure point to a destination, providing route guidance to a destination, performing map matching to correct the own position on a road, and searching for a destination. Although not shown in the drawings, the navigation computation unit 47 in the present example has five application programs that serve as navigation operation programs: a display program, a map matching program, a route calculation program, a guidance program, and a search program. The operation processes of the navigation device 2 performed by these application programs are known, and will therefore not be explained in detail here. Also note that the map data Mb is referenced and used in the application programs.

The update request generation unit 48 generates an update request fb, which is formed of an update request map range 51 and identification information, to be transmitted to the map update data supply device 1. The update request generation unit 48 determines the update request map range 51 and generates the update request fb, which is used to request the first supply data file fa1 and the second supply data file fa2 for the update request map range 51 from the map update data supply device 1. In the present example, the update request map range 51 includes a map range currently needed and a map range that is highly likely to be needed in the future. It should be noted that the map range may be a section range. For example, the update request map range 51 may correspond to a map range within a prescribed radial distance from a position registered as a home position, or a map range that includes the surroundings of the current own position detected by the own position detection device 42, the surroundings of a destination, the surroundings of a route set to a destination, or the like. When determining the above-described update request map range 51, the map range is preferably configured as a minimum required range, e.g. the map range to be updated around the home position is set wide while the map range to be updated around a route to a destination is set narrow.

If a request to perform update processing for a map specified by the user of the navigation device 2 is received, the thus specified map range is set as the update request map range 51. In this case, the update request map range 51 corresponds to an administrative section range or the like, such as one, two, or more prefectures specified by the user. The update request fb is generated as a data file that includes information for specifying the update request map range 51, e.g. map coordinate information, central coordinate information and radial distance information, and specified city and prefecture information. Alternatively, if the map range is a section range, the update request fb is generated as a data file that includes section ID information and the like, which are used in common with the difference update data file Ma and the overwrite update data file Mc of the map update data supply device 1.

The identification information includes information required by the map update data supply device 1 to specify the navigation device 2 and the content of update data supplied in the past. In the present example, the identification information includes an identification code such as a serial number of the navigation device 2, as well as information on the latest supply date of update data and the like. In the identification information, the navigation device 2 may also include latest version information of the sections p for which update data was supplied.

The map data update unit 49 overwrite or difference updates the map data Mb based on the first supply data file fa1 and the second supply data file fa2 supplied by the map update data supply device 1. As will be described later, in the present example, the first supply data file fa1 and the second supply data file fa2 are files that include map data for respectively overwrite or difference updating a request update section 23 that is determined based on the update request map range 51, and a safeguard update section 24 that is a surrounding section range of the request update section 23. Accordingly, the map data update unit 49 updates the map data Mb by overwrite or difference updating the map data of the section p that corresponds to the request update section 23 and the safeguard update section 24 in the layer 1 of the main map data Mb1 of the map data Mb, based on the map data of the request update section 23 and the safeguard update section 24 included in the first supply data file fa1 and the second supply data file fa2.

The communication control unit 50 performs an operation control of the communication device 46. Specifically, the communication control unit 50 controls communication between the navigation device 2 and the map update data supply device 1 using the communication device 46, and causes the communication device 46 to perform operations to transmit the update request fb to the map update data supply device 1, receive the first supply data file fa1 and the second supply data file fa2 transmitted from the map update data supply device 1, and the like.

2. Map Update Data Supply Device 1

As shown in FIG. 1, the map update data supply device 1 includes an update map database DB1, a management database DB2, a safeguard version table SVT, a control device 3, an input device 4, a display device 5, and the communication device 6. The control device 3 includes a database update unit 7, a version table update unit 8, a management database update unit 9, a request update data extraction unit 10, a safeguard update data extraction unit 11, an integrated data generation unit 12, an integrated data supply unit 13, and a communication control unit 14. Here, the control device 3 is configured to include computational processing devices such as a CPU, and a storage medium such as a RAM or a ROM for storing software (programs), data, and the like. Each unit 7 to 14 included in the control device 3 has as its core member a computational processing device of the control device 3. Each functional portion for performing various types of processing on data that is input can be implemented by one of hardware, software, and both hardware and software. In addition, the update map database DB1, the management database DB2, and the safeguard version table SVT may be stored in a rewritable storage medium such as a hard disk drive or a flash memory, for example.

The map update data supply device 1 includes a map update data supply program that is a program for supplying map update data. The map update data supply program has steps that correspond to processes performed by the units included in the map update data supply device 1. The map update data supply program causes the computational processing devices (computers) included in the map update data supply device 1 to execute each step, whereby each process is executed. Although it may not be especially noted in the following descriptions, the map update data supply program has steps that correspond to the processes performed by the map update data supply device 1. The constitutions of the respective parts of the map update data supply device 1 will be described below in succession.

2-1. Update Map Database DB1

The update map database DB1 manages per section p versions of the update data files in the map database DB3, and also stores per section p the overwrite update data file Mc, which is an update data file for overwrite updating to a latest version, and the difference update data file Ma, which is an update data file for difference updating to a particular version.

As described above, the overwrite update data file Mc for the section p includes all data constituting the map data of that particular section, and thus has a large volume of data. Storing all past versions of the overwrite update data file Mc increases the number of versions and greatly inflates the volume of data. Therefore, by storing only the latest version of the overwrite update data file Mc for the section p, the volume of data stored in the update map database DB1 can be decreased. Meanwhile, the update data file Ma for difference updating the section p has only data pertaining to a version-specific update, and thus has a relatively small volume of data. Consequently, storing all versions of the difference update data file Ma does not result in a relatively large volume of data.

In the present embodiment, a section ID (A1, A2, etc.) is set for each section p, and the versions of the sections p are managed per section ID as shown in FIG. 3. A version upgrade per section p is performed each time new information is input by the input device 4, and the overwrite update data file Mc for overwrite updating already stored for the section p is updated and the difference update data file Ma for difference updating is newly generated by the database update unit 7. The overwrite update data files Mc and difference update data files Ma are stored and managed in the update map database DB1, together with the section ID and version information. In the present example, the oldest overwrite update data file Mc and difference update data file Ma first created for the initial map database DB3 are designated as version 1 (Ver. 1). The version is upgraded to version 2 (Ver. 2), version 3 (Ver. 3) and so forth each time the overwrite update data file Mc and the difference update data file Ma are generated for a section ID based on new information. In the present embodiment, the latest version of the section p is recorded in a version table VT stored in the update map database DB1 to facilitate searching. The version table VT is updated when a new version of the overwrite update data file Mc and the difference update data file Ma for the section p is generated. In the present example, as shown in FIG. 4, the version table VT is a data table that records the latest version of each section ID. According to the example shown in FIG. 4, the latest version of the sections A1 and A2 is currently 6, the latest version of a section A3 is 4, and the latest version of a section A4 is 3. Note that, although the present embodiment is provided with the version table VT, the overwrite update data file Mc or the difference update data file Ma stored in the update map database DB1 may be searched in order to search for the latest version of the section p instead of providing the version table VT. In addition, the version information may be managed together with information related to the date each version of the overwrite update data file Mc and the difference update data file Ma was generated.

The overwrite update data file Mc for the section p, which is a data file for overwrite updating the map data Mb of the section p, has the same format as the map data Mb of the section p and includes all data constituting the map data of that particular section p. An update of the map data Mb in the navigation device 2 is executed by using the supplied overwrite update data file Mc for the section p to replace (overwrite update) the map data Mb of the corresponding section p.

The difference update data file Ma for the section p, which is a data file for difference updating the map database DB3 for the section p, is constituted from an accumulation of update data for difference updating that makes additions, modifications, and deletions per data unit DU. FIG. 6 shows a data format example of deletion, addition, and modification update data. Here, FIG. 6 shows in particular critical road data among the various types of data included in the map database DB3, which will be described in detail below.

The deletion update data has identification code data that is required to specify the identification code of the data unit DU to be deleted. The identification code is a road ID in the road data. In the present example, the data size of the identification code is 4 bytes. Supplying the deletion update data having specific identification code data to the navigation device 2 results in the navigation device 2 deleting from the map database DB3 the data unit DU of the specific identification code.

The addition update data includes all data required to form one data unit DU in the map database DB3. In the present example, the addition update data is constituted from an identification code and attribute data. Here, the attribute data is data related to a subject matter specified by the identification code. The attribute data in the addition update data is constituted from all data related to the subject matter specified by the identification code. In the road data example shown in FIG. 6, in addition to the road ID that is the identification code of the data unit DU, the addition update data includes as data items of the attribute data: a road type; a start point intersection ID; an end point intersection ID; various flags; a yes/no flag for an extension data flag; a road length; a classification, width, etc.; and a one-way flag. The data items of the attribute data in the present example respectively have data sizes of 1, 4, 4, 2, 2, 2, 4, and 1 byte, as shown in FIG. 6. The overall data size of the addition update data is 24 bytes, which is the sum of the 4 bytes of the identification code and the 20 bytes of the attribute data.

Here, the data items of the attribute data in the road data will be described. The road type refers to data that specifies a road classification such as expressway or local road, and in the present example, the road type is expressed in 2 bits. Given that the road data is data on roads that connect intersections, the start point intersection ID and the end point intersection ID refer to data for specifying intersections that are respectively the start point and end point of a road. Here, the term intersection is used in the broadest sense as a point that segmentalizes a road and has certain specific coordinates; however, the intersection is not necessarily a point at which two or more roads cross. It should be noted that the attribute data of each intersection ID is stored in intersection data that is separate from the road data, and the intersection data is constituted from a data unit DU associated with the intersection ID, which is also the identification code. If an intersection addition is required in accordance with the addition update data of the road data, addition update data for the intersection data is generated. Next, the various flags are flag data that expresses whether any of various types of roads applies, e.g. whether a road is a motor road, a toll road, a bridge, or a tunnel, which are allocated per bit of the various flags data. The extension data yes/no flag is flag data that expresses whether various types of extension data are present or absent, e.g. the presence/absence of VICS data, the presence/absence of a railroad crossing, the presence/absence of seasonal restriction data, and the presence/absence of road numbers, which are allocated per bit of the extension data yes/no flag data. The various types of extension data are stored separate from the road data, and include restriction data, guidance data, and the like. The road length is data on the length of a road from the start point intersection to the end point intersection. The classification, width, etc. are data that expresses the detailed classification, width, and the like of a road. The one-way flag is flag data that expresses whether only one-way traffic is allowed, the type of one-way traffic, and the like. Note that the flag is binary data that expresses 0 or 1, or the like. In the present example, the flag is binary data expressed by a 0 or 1 in the bit of each column when the data is expressed in binary notation. One-byte flag data has eight bits and represents a maximum of eight flags. In addition, the data items of the attribute data may be set according to data type, such as road data, intersection data, restriction data, and guidance data, and thus set as various types of common data items.

The modification update data has identification code data that is required to specify the data unit DU of the identification code to be modified, and attribute data that is used to modify various types of data within the data unit DU. In the present example, as attribute data, the modification update data has an update yes/no flag that expresses whether there is an update per data item of the attribute data subject to modification, and post-update data for each data item of the attribute data subject to modification. In the road data example shown in FIG. 6, in addition to the road ID that is the identification code of the data unit DU, the modification update data includes: an update yes/no flag; various flags serving as data of the data items of the attribute data subject to modification; a yes/no flag for an extension data flag; a road length; a classification, width, etc.; and a one-way flag. According to the present example, the update yes/no flag is flag data that expresses whether there is an update of each data item per bit, and has a data size of one byte. The allocation of data items per bit is as follows. Various flags are bit 2; the yes/no flag for the extension data flag is bit 3; the road length is bit 4; the classification, width, etc. is bit 5; and the one-way flag is bit 6. Note that, in the present example, the road type data is allocated by effectively utilizing bits 0 and 1, which are extra bits not allocated with flag data out of the one byte used for the update yes/no flag.

Update data that modifies the road data includes the data items of the post-update attribute data. This does not include the data items of the start point intersection ID and the end point intersection ID associated with the road ID, which is the identification code corresponding to that particular road data. Therefore, compared to the addition update data, the volume of modification update data can be reduced because the modification update data excludes the data items of the start point intersection ID and the end point intersection ID from the attribute data. As described above, the road data is data on roads that connect intersections of two specific IDs, so an update that modifies the road data does not include modifications of the start point intersection ID and the end point intersection ID. In order to modify the start point intersection ID and the end point intersection ID of the road data, an update to delete the road data is first performed, and then an update to add road data with the modified start point intersection ID and end point intersection ID is performed. When performing an update to add road data that modifies the start point intersection ID or the end point intersection ID, the road ID that is the identification code changes.

In the present example, the modification update data of the road data, regardless of whether there is an update of each data item of the attribute data, includes the data of all data items, which are all data items with a potential to be updated, except for the start point intersection ID and the end point intersection ID. Thus, as shown in FIG. 6, the overall data size of the modification update data is 16 bytes, which is the sum of the 4 bytes of the identification code and the 12 bytes of the attribute data formed of the data items and the update yes/no flag. The volume of modification update data is less than 24 bytes, which is the data size of the addition update data.

The navigation device 2 may be configured so as to update the map database DB3 with regard to only the data items for which there is an update, based on the supplied update yes/no flag data. Accordingly, the update time of the map database in the navigation device can be decreased.

According to the present embodiment, a configuration is used in which the modification update data includes the data of all data items except for the start point intersection ID and the end point intersection ID, regardless of whether there is an update of each data item of the attribute data. However, a configuration may be used in which the modification update data includes the post-update data of only the data items for which the update yes/no flag indicates there is an update. With such a configuration, the data size of the modification update data can be further reduced. Moreover, in this case, the modification update data may be constituted without the update yes/no flag.

2-2. Management Database DB2

The management database DB2 manages the current versions of the sections p in the map database DB3 for each of a plurality of navigation devices 2. When the difference update data file Ma or the overwrite update data file Mc is supplied to the navigation device 2, the management database DB2 is updated by the management database update unit 9 using the supplied version of the section p. In the present embodiment, the management database DB2 stores a management data table DT that is generated per navigation device 2. As shown in FIG. 7, the management data table DT records a current version per section ID, and records an identification code such as the serial number of the navigation device 2 together with identification information such as the latest supply date. It should be noted that the current version is the newest version among the versions of the update data file for the section p supplied in the past.

Thus, the map update data supply device 1 uses the management database DB2 to self-manage the versions of the difference update data file Ma and the overwrite update data file Mc that are supplied to the navigation device 2. Therefore, the map update data supply device 1 can reduce the communication time to acquire the current version information of the map database DB3 for each section p from each navigation device 2 through communication, and decrease the data update time of the navigation device 2.

2-3. Safeguard Version Table SVT

The safeguard version table SVT stores, as a safeguard version va and associated with a section group g that is a combination of the section p and a section p adjacent thereto of the update map database DB1, a version of the difference update data file Ma for the section p when it is necessary to safeguard a road network connection between the sections p that constitute the section group g.

In other words, when the difference update data file Ma is generated for a road that pertains to a road network connection between adjacent sections p, the versions of the difference update data file Ma for those particular sections p at such time are cumulatively recorded in the safeguard version table SVT as the safeguard versions va of the sections p in the section group g formed of the two adjacent sections p.

The safeguard version table SVT is thus provided as storing the safeguard version va associated with the section group g. Therefore, using a simple process to search the safeguard version table SVT, it is possible to determine the necessity of a network safeguard for the section group g and extract an update safeguard version uva. In addition, the computation load of the update data supply device 1 can be reduced. The safeguard version table SVT also cumulatively records the safeguard version va up to the present for the section group g. Therefore, as will be described later, the safeguard version table SVT can be used to extract a safeguard update section 24 back to a past safeguard version va. It is thus possible to narrow a section range in which the safeguard update sections 24 spread out in a chain manner, and execute extraction using a simple process.

Figure 8:
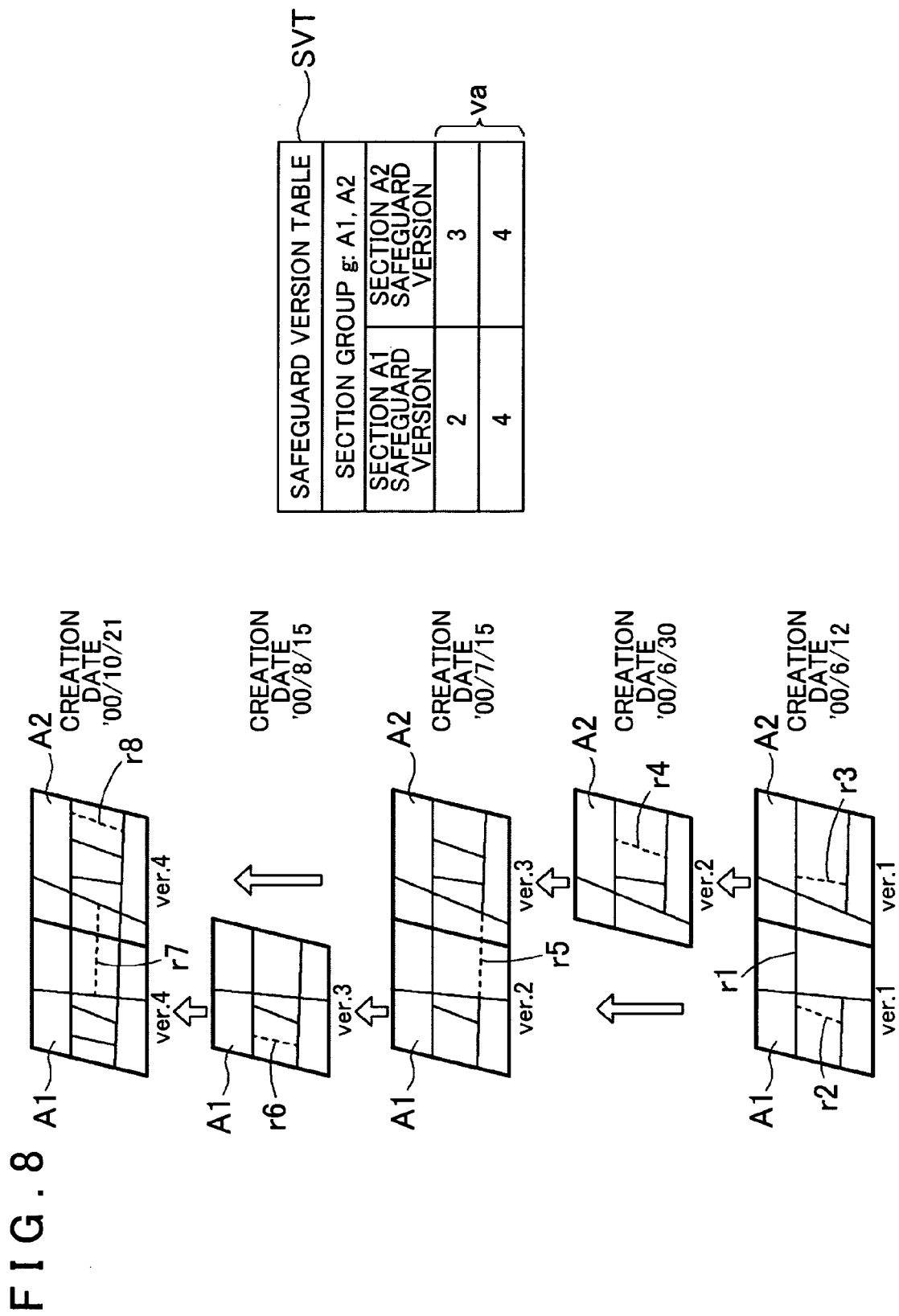
FIG. 8 shows explanatory drawings for explaining a determination method of a safeguard version.
Figure 10:
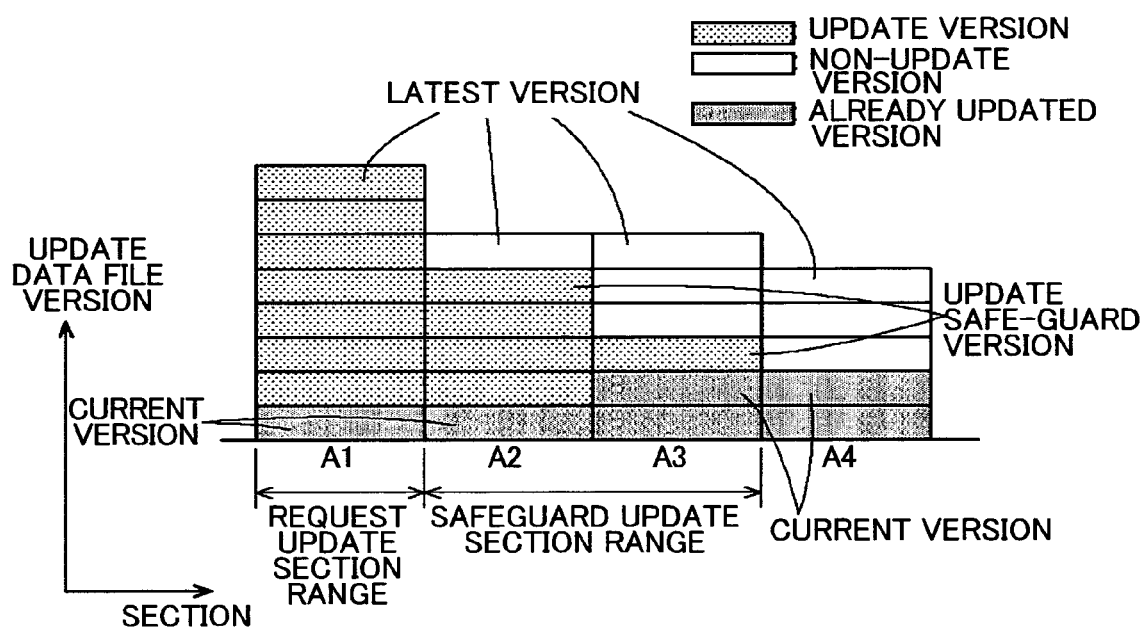
FIG. 10 is an explanatory drawing for explaining the extraction method of the safeguard update section and the update safeguard version.

Referring to FIG. 8, a specific example of updating the safeguard version table SVT will be described. Note that the series of processes pertaining to FIG. 8 are executed by the version table update unit 8 and the database update unit 7. In the example of the section group g that has a section A1 and a section A2 as shown in FIG. 8, there is a road r1 that spans between the two adjacent sections p in the initial map database DB3. In an update data file with a creation date of Jun. 12, 2000, in the section A1, a road r2 that does not span between two adjacent sections p is newly added. Version 1 of a difference update data file Ma for performing a difference update that adds the road data of the road r2 is thus generated. Meanwhile, with the same creation date of Jun. 12, 2000, in the section A2, a road r3 that does not span between two adjacent sections p is newly added, and version 1 of the difference update data file Ma that pertains to the addition of the road data of the road r3 is thus generated. Here, for ease of understanding, FIG. 8 shows the map data of the section A1 and the section A2 concerning the same creation date arranged side by side. Next, with a creation date of Jun. 30, 2000, in the section A2, a road r4 that does not span between two sections p is newly added. The difference update data file Ma that is upgraded to version 2, which pertains to the addition of the road data of the road r4, is generated accordingly.

Note that since none of the roads r2, r3, and r4 added on Jun. 12, 2000 and Jun. 30, 2000 are roads that span between adjacent sections p, there is no need for a network safeguard. Accordingly, the generated difference update data file Ma for the section p that adds no road data of a road spanning between adjacent sections p is a difference update data file Ma that does not require a network safeguard. Consequently, the version of such a difference update data file Ma is not used as the safeguard version va.

Next, with a creation date of Jul. 15, 2000, a road r5 that spans between the section A1 and the section A2, i.e., two adjacent sections p, is newly added. Thus, the difference update data file Ma that is upgraded to version 2, which pertains to the addition of the road data of the road r5, and the difference update data file Ma that is upgraded to version 3, which pertains to the addition of the road data of the road r5, are generated for the section A1 and the section A2, respectively. The added road r5 spans between sections p, and is thus a road that pertains to a road network connection between adjacent sections p and requires a network safeguard. In view of the addition of a road that spans between adjacent sections p as described above, the generated difference update data files Ma for the adjacent sections p pertaining to this road are difference update data files Ma that require a network safeguard. Consequently, these versions of the difference update data files Ma are used as the safeguard version va. The safeguard versions va of the adjacent sections p are additionally recorded in the safeguard version table SVT as the safeguard versions va of the section group g formed of the adjacent sections p. In the example of FIG. 8, with regard to the section group g formed of the sections A1 and A2, a safeguard version group (A1: 2, A2: 3) that sets the safeguard version va of the section A1 as 2 and the safeguard version va of section A2 as 3 is additionally recorded in the safeguard version table SVT.

Next, with a creation date of Aug. 15, 2000, in the section A1, a road r6 that does not span between two sections p is newly added, and the difference update data file Ma that is upgraded to version 3 and pertains to the addition of the road data of the road r6 is generated accordingly. With a creation date of Oct. 21, 2000, a road r7 that spans between the section A1 and the section A2, i.e., two adjacent sections p, is newly added, and a road r8 that does not span between two sections p is newly added in the section A2. For the section A1, the difference update data file Ma that is upgraded to version 4, which adds the road data of the road r7, is generated; for the section A2, the difference update data file Ma that is upgraded to version 4, which pertains to the addition of the road data of the road r7 and the road r8, is generated. As described above, since an update data file that pertains to a road that spans between adjacent sections p is generated, a network safeguard is necessary. Therefore, using the versions of the difference update data files Ma for the sections p as the safeguard version, the safeguard version group (A1: 4, A2: 4) is additionally recorded in the safeguard version table SVT.

Note that when the difference update data file Ma is generated as described above, the overwrite update data file Mc upgraded to the same version is simultaneously generated. The latest overwrite update data file Mc for each section is stored in the update map database DB1. Since only the latest version of the overwrite update data file Mc is stored in the update map database DB1, the safeguard version table SVT stores the safeguard version related to the difference update data file Ma.

2-4. Input Device 4, Display Device 5, and Communication Device 6

Next, returning to FIG. 1, the input device 4, the display device 5, and the communication device 6 of the map update data supply device 1 will be described. The input device 4 is configured to include various types of devices for input, such as a keyboard, a mouse, a touch panel, and a scanner. Using the input device 4, an operator can perform an update input that adds, modifies, or deletes map information to upgrade the versions of the difference update data file Ma and the overwrite update data file Mc. The display device 5 is configured to include a liquid crystal display, a CRT display, or the like. When the operator uses the input device 4 to perform an operation, the display device 5 can display the status of the difference update data file Ma and the overwrite update data file Mc, and the content of an update operation thereof. The communication device 6 has a configuration that enables communication with and the transmission and reception of data to and from the communication device 46 of the navigation device 2 through various types of known wired or wireless communication networks. The Internet, a wired or wireless public telephone network, a wired or wireless LAN (Local Area Network), or a private network, for example, may be used as a communication network. In the present embodiment, the communication device 6 includes at least two selectable data supply methods whose communication costs differ depending on the volume of data, and the communication device 6 includes a plurality of types of communication devices that correspond to the data supply methods. The various types of communication networks mentioned above are mere examples of such data supply methods, and the communication device 6 includes a plurality of various types of communication devices that correspond to the communication networks. It should be noted that, in the present application, the communication cost includes one or both of a communication fee and a communication time.

In addition, the exchange of data between the map update data supply device 1 and the navigation device 2 is preferably performed through separate communication devices such as a personal computer or a storage medium such as various types of memories and disks, with the communication device 6 able to select the data supply method through these communication devices.

2-5. Control Device 3

As described above, the control device 3 includes the database update unit 7, the version table update unit 8, the management database update unit 9, the request update data extraction unit 10, the safeguard update data extraction unit 11, the integrated data generation unit 12, and the communication control unit 14, as well as an update time determination unit 15.

2-5-1. Database Update Unit 7

The database update unit 7 performs processing on the update input that adds, modifies, and deletes map information through the input device 4. In addition, the database update unit 7 performs, based on the update input, processing that generates a new version of the difference update data file Ma for difference updating, updates the already stored overwrite update data file Mc for overwrite updating, and stores the difference update data file Ma and the overwrite update data file Mc together with the version information in the update map database DB1.

At such time, the generated new version of the difference update data file Ma and the updated overwrite update data file Mc are considered to be the latest generated versions for the section p, and the latest version corresponding to that particular section p stored in the version VT is updated accordingly.

2-5-2. Version Table Update Unit 8

The version table update unit 8 performs, when the database update unit 7 generates new versions of the difference update data files Ma requiring a network safeguard for two adjacent sections p as described above, processing that associates the new versions, as the safeguard versions va of the adjacent sections p, with the section group g formed of the two adjacent sections p, and cumulatively records these in the safeguard version table SVT.

2-5-3. Management Database Update Unit 9

The management database update unit 9 performs, when the information of the difference update data file Ma or the overwrite update data file Mc is supplied to the navigation device 2, processing that updates the management database DB2 based on the supplied version information of the section p. In the present example, the management database update unit 9 updates the management data table DT provided in the navigation device 2 using the section ID of the supplied difference update data file Ma or overwrite update data file Mc, and the version thereof. If the section ID to be updated already exists in the management data table DT, only the version is updated; however, if the section ID to be updated does not already exist in the management data table DT, the section ID and the version are added. When updating the management data table DT, the management database update unit 9 also updates identification information such as the identification code of the navigation device 2 and the supply date of the update data, which are included in the update request fb from the navigation device 2.

2-5-4. Request Update Data Extraction Unit 10 and Update Time Determination Unit 15

The request update data extraction unit 10, based on the update request fb from the navigation device 2, performs processing that extracts the request update section 23 that is a section subjected to an overwrite update, and extracts for each request update section 23 the overwrite update data file Mc as the first supply data file fa1 that is a data file to be supplied to the navigation device 2.

In the present embodiment, the request update data extraction unit 10 extracts the overwrite update data file Mc and up to the latest version of the difference update data file Ma for each request update section 23. The update time determination unit 15 then compares the overwrite update data file Mc and up to the latest version of the difference update data file Ma for each request update section 23 based on a prescribed index related to update time, and determines which carries a shorter update time. The request update data extraction unit 10 subsequently extracts as the first supply data file fa1, which is a data file to be supplied to the navigation device 2, either of the overwrite update data file Mc and up to the latest version of the difference update data file Ma determined by the update time determination unit 15 as carrying the shorter update time for each request update section 23.

First, the request update data extraction unit 10, based on the update request fb from the navigation device 2, performs processing to extract the request update section 23 that is a section subject to an overwrite or difference update. In the present embodiment, the update request fb includes the update request map range 51, which is a map range for which the navigation device 2 is requesting the supply of an update data file. The update request map range 51 includes a preset map range or a map range specified by the user of the navigation device 2. For example, a map range within a prescribed radial distance from a position registered as the home of the user of the navigation device 2, an administrative section range such as one, two, or more prefectures specified by the user, or a map range that includes the surroundings of the current own position detected by the own position detection device 42, the surroundings of a destination, the surroundings of a route set to a destination, or the like. Here, the map range may be a section range. In the present example, from the update request map range 51 included in the update request fb from the navigation device 2, the request update data extraction unit 10 extracts the request update section 23 that is a section p for which there exists map data such as road data subject to an overwrite or difference update.

The request update data extraction unit 10 then performs processing to extract the overwrite update data file Mc and up to the latest version of the difference update data file Ma, which are to be supplied to the navigation device 2 for each request update section 23. In the present embodiment, the request update data extraction unit 10 extracts for each request update section 23 all versions of the difference update data file Ma that are newer than the current version managed by the management database DB2, up to the latest version stored in the update map database DB1.

The map update data supply device 1 is thus able to suppress the duplication and extraction of versions already supplied to the navigation device 2. Therefore, the volume of data and number of difference update data files Ma to be supplied depending on the navigation device 2 can be minimized.

More specifically, based on an identification code of the navigation device 2 such as the serial number and identification information such as the latest supply date which are included in the update request fb from the navigation device 2, the request update data extraction unit 10 specifies the management data table DT that matches the navigation device 2 that originated the update request fb, from the management data tables DT of the plurality of navigation devices 2 managed in the management database DB2. The request update data extraction unit 10 then extracts the current version of the difference update data file Ma already supplied to the navigation device 2 for each request update section 23 from the specified management data table DT. Next, the request update data extraction unit 10 extracts the latest version for each request update section 23 from the version table VT of the update map database DB1. The request update data extraction unit 10 subsequently extracts all versions of the difference update data file Ma that are newer than the current version in the navigation device 2, up to the latest version stored in the update map database DB1. The extracted versions become update versions of the update data to be supplied.

Meanwhile, turning to the extraction of the overwrite update data file Mc, since the overwrite update data file Mc includes the map data after difference updating all versions up to the latest version of the initial map data, there is no need to acquire the current version already supplied to the navigation device 2 or the latest version information in the update map database DB1. However, even if only the overwrite update data file Mc is extracted for all the request update sections 23, the difference update data file Ma is extracted for the safeguard update sections 24 around the request update section range, which will be described later. Therefore, it is necessary to acquire the current version and the latest version information. Accordingly, the management data table DT that matches the navigation device 2 that originated the update request fb is identified so that the current version of the section p can be acquired. In such case, however, the safeguard update data extraction unit 11 may include processing to acquire the current version and the latest version information.

The identification information included in the update request fb from the navigation device 2 may not match the identification information stored in the management database DB2, and the data of the navigation device 2 that originated the update request fb may not be stored in the management database DB2. In such case, the map update data supply device 1 requests that the navigation device 2 transmit to the map update data supply device 1 the current versions of the difference update data file Ma and the overwrite update data file Mc for the section p already supplied to the navigation device 2. Based on the data received from the navigation device 2, the request update data extraction unit 10 extracts the current version for each request update section 23 of the navigation device 2 from the update map database DB1. Note that this data exchange is performed by the communication control unit 14 and the communication device 6.

In the present example, data having the same format as the management data table DT stored in the management database DB2 is transmitted from the navigation device 2, and the management database update unit 9 performs processing to add the received management data table DT of the navigation device 2 to the management database DB2. Thereafter, the request update data extraction unit 10 extracts the current version managed in the management database DB2 for each request update section 23 as described above.

For a first update of the navigation device 2 or for a first update of the navigation device 2 after its data has been initialized, the navigation device 2 includes information in the update request fb that indicates the update is a first update. Consequently, the request update data extraction unit 10 does not use the information in the management database DB2 and sets the initial version (version 0) stored in the update map database DB1 for each request update section 23 as the current version. Note that after the update data is supplied, the management database update unit 9 performs processing to add the management data table DT of that particular navigation device 2 to the management database DB2.

Next, the request update data extraction unit 10 extracts for each request update section 23 all versions of the difference update data file Ma that are newer than the extracted current version from the update map database DB1, up to the latest version stored in the update map database DB1.

As described above, the update time determination unit 15 then compares the overwrite update data file Mc and up to the latest version of the difference update data file Ma for each request update section 23 based on a prescribed index related to update time, and determines which carries a shorter update time.

The prescribed index related to update time comprehensively evaluates update times pertaining to a series of map data updates. For example, a plurality of indices related to update time such as a map data update processing time within the navigation device 2, a data distribution time from the map update data supply device 1 to the navigation device 2, and a supply data generation time within the map update data supply device 1, as well as communication cost and convenience, are evaluated. In the present embodiment, the prescribed index is expressed as the computation results of an arithmetic expression that uses parameters that represent each index related to update time.

Next, the prescribed index related to the update times carried by the overwrite update data file Mc and the difference update data file Ma will be described.

The overwrite update data file Mc includes all information constituting the map data Mb except for data subject to an update. Therefore, compared to the difference update data file Ma, one overwrite update data file Mc has a large volume of data and a longer distribution time. However, the update processing time within the navigation device 2 is shorter than the difference update of the difference update data file Ma, because only processing (overwrite processing) is performed to replace the map data Mb with the overwrite update data file Mc for the section p as described above. The distribution time increases in proportion to the volume of data in the overwrite update data file Mc for the section p. The volume of data in the overwrite update data file Mc for the section p does not significantly increase or decrease regardless of the number of versions to be updated of the section p.

Meanwhile, the difference update data file Ma includes only information on data subject to an update. Therefore, compared to the overwrite update data file Mc, one difference update data file Ma has a smaller volume of data and a shorter distribution time. However, during the update processing within the navigation device 2, as described above, it is necessary to successively perform data processing to determine the update content while rewriting data per data unit DU of each identification code. Consequently, compared to the overwrite update of the overwrite update data file Mc, the update processing time is longer per unit volume of data. The update processing time in particular within the navigation device 2 significantly increases in proportion to the volume of data in the difference update data file Ma for the section p. The volume of data in the difference update data file Ma for the section p increases in proportion to the number of versions to be updated and the quantity of update data associated with each identification code.

Accordingly, one overwrite update data file Mc has a large volume of data and thus a relatively long distribution time, although the update processing time is relatively short because an overwrite update is performed. Further, the distribution time increases in proportion to the volume of data for the section p, while the update processing time does not significantly change. Since the number of data files for the section p is only one regardless of the number of versions to be updated, the volume of data for the section p does not change in proportion to the number of versions to be updated.

Meanwhile, one difference update data file Ma has a small volume of data and thus a relatively short distribution time, although the update processing time is relatively long because a difference update is performed. Further, the update processing time in particular increases in proportion to the volume of data for the section p, while the volume of data of the section p is proportional to the number of versions to be updated and the quantity of update data in the update contents.

Thus, in the present embodiment, the index pertaining to the update time carried by the overwrite update data file Mc is mainly set in relation to the distribution time, and the index is the computation results of an arithmetic expression that uses the data size of the overwrite update data file Mc for the section p as a parameter. Meanwhile, the index pertaining to the update time carried by the difference update data file Ma is mainly set in relation to the update processing time within the navigation device 2, and the index is the computation results of an arithmetic expression that uses the data size of the difference update data file Ma for the section p, or the number of versions of the difference update data file Ma to be updated, or the quantity of update data associated with each identification code as a parameter.

In the present example, the update time determination unit 15 computes an overwrite update time Tmcp that represents the prescribed index pertaining to the update time carried by the overwrite update data file Mc for the request update section 23, by multiplying together a data size Dmcp of the overwrite update data file Mc for the request update section 23 and a coefficient a1 that converts the data size Dmcp into a corresponding update time. Specifically, the arithmetic expression is Equation (1) below.

$$Tmcp = a1 \times Dmcp \tag{1}$$

In the present example, the coefficient a1 is mainly set in relation to the distribution time per unit data size, and the overwrite update time Tmcp mainly corresponds to the distribution time of the overwrite update data file Mc.

Meanwhile, the update time determination unit 15 computes a difference update time Tmap that represents the prescribed index pertaining to the update time carried by the difference update data file Ma for the request update section 23, by multiplying together a data size Dmap of data that combines all extracted versions up to the latest version of the difference update data file Ma for the request update section 23 and a coefficient a2 that converts the data size Dmap into a corresponding update time. Specifically, the arithmetic expression is Equation (2) below.

$$Tmap = a2 \times Dmap \tag{2}$$

In the present example, the coefficient a2 is mainly set in relation to the difference update processing time per unit data size, and the difference update time Tmap mainly corresponds to the difference update processing time of the difference update data file Ma.

Here, if the navigation device 2 is supplied with a request update integrated data file 33, which is generated by integrating up to the latest version of the different update data file Ma into one difference update data file using the integrated data generation unit 12 that will be described later, the data size of the request update integrated data file 33 for the request update section 23 is set as Dmap. Therefore, processing performed by the integrated data generation unit 12 to generate the request update integrated data file 33 is executed before the update time determination unit 15 performs processing.

Even if the volume of data is the same, the update time may vary depending on the computation processing speed and communication speed of the map update data supply device 1 and the navigation device 2, the communication speed of the communication network, and the like. In the present example, the update time determination unit 15 adaptively sets the coefficients a1 and a2 in accordance with various speed parameters, such as a communication speed of a set or detected communication network, or a computation processing speed and a communication speed that vary depending on the model of the navigation device 2. The coefficients a1 and a2 may be set using a data table that is preset in accordance with the speed parameters, or the coefficients a1 and a2 may be set based on an arithmetic expression that uses the speed parameters. In this manner, the coefficients a1 and a2 can adapt to variations in each speed parameter, thus improving determination accuracy.

Alternatively, instead of setting the coefficients a1 and a2 to coefficients that are only converted into times, the coefficients a1 and a2 may be comprehensively adjusted and set in consideration of factors other than time, such as the communication cost, the data supply method, and the comfort perceived by the user of the navigation device 2. In such case, the coefficients a1 and a2 may be adaptively set only in accordance with the communication cost and the data supply method of a set or detected communication network, or in addition to setting the coefficients a1 and a2 in accordance with the above speed parameters. In this manner, the coefficients a1 and a2 can correspond to multiple factors, thus further improving economy and convenience.

In the present example, the update time determination unit 15, respectively calculates per request update section 23 the overwrite update time Tmcp that is the prescribed index pertaining to the update time carried by the overwrite update data file Mc, and the difference update time Tmap that is the prescribed index pertaining to the update time carried by the difference update data file Ma. The values of the overwrite update time Tmcp and the difference update time Tmap are then compared, and the data file with a smaller value is determined as carrying a shorter update time.

The request update data extraction unit 10 subsequently extracts as the first supply data file fa1, which is a data file to be supplied to the navigation device 2, either of the overwrite update data file Mc and up to the latest version of the difference update data file Ma determined by the update time determination unit 15 as carrying the shorter update time for each request update section 23.

Here, if the navigation device 2 is supplied with a request update integrated data file 33 that is generated by the integrated data generation unit 12 as described above, the request update integrated data file 33 is extracted as the first supply data file fa1 in place of up to the latest version of the difference update data file Ma.

Here, the prescribed index pertaining to the update time carried by the overwrite update data file Mc is not calculated, and only the prescribed index pertaining to the update time carried by the difference update data file Ma for the request update section 23 is calculated. Then, by comparing the calculated index of the difference update data file Ma against a prescribed threshold, a determination may be made regarding which of the overwrite update data file Mc and up to the latest version of the difference update data file Ma carries a shorter update time. In such case, whether the update time is shorter or longer is determined based on whether the calculated index for the difference update data file Ma is greater than or less than the prescribed threshold. In the above example of the difference update time Tmap, if the difference update time Tmap for the request update section 23 is less than a prescribed threshold X1, the update time carried by the difference update data file Ma is determined to be shorter.

This determination can be made because the volume of data in the overwrite update data file Mc for the request update section 23 does not significantly fluctuate depending on the version. If the volume of data in the overwrite update data file Mc increases or decreases between sections p, the volume of data in the difference update data file Ma generally increases and decreases in proportion to increases and decreases in the volume of data in the overwrite update data file Mc. This is because the volume of difference update data for the map data also increases and decreases generally in proportion to the volume of map data in the overwrite update data file Mc. This configuration thus enables a further reduction in the processing load while maintaining the determination accuracy.

In addition, the difference update time Tmap for the request update section 23 may be considered the number of versions of the difference update data file Ma to be updated for the request update section 23. If the difference update time Tmap for the request update section 23 is less than a predetermined threshold X2, the update time carried by the difference update data file Ma is determined to be shorter. Since the number of versions and the total volume of data thereof is generally proportional, the processing load can be further reduced while maintaining the determination accuracy.

In such case, similar to the above coefficients a1 and a2, the prescribed thresholds X1 and X2 may be adaptively set depending on a computation processing speed, a communication speed, a communication cost, and the like. Thus, determination accuracy, economy, and convenience can be further improved.

As described above, the integrated data supply unit 13 includes at least two selectable data supply methods whose communication costs differ depending on the volume of data. Here, the differing communication costs refer to a comprehensive cost that considers one or both of a communication fee and a communication time accumulated when a unit volume of data is transmitted or received.

Hence, the request update data extraction unit 10 may extract either of the overwrite update data file Mc and the difference update data file Ma as the first supply data file fa1 depending on the communication cost of the selected or detected data supply method. In such case, the request update data extraction unit 10 may be set such that the difference update data file Ma is more likely to be extracted when the communication cost is high, and set such that the overwrite update data file Mc is more likely to be extracted when the communication cost is low.

In the present example, as described above, the coefficients a1 and a2 may be changed depending on the communication cost. In such case, when the communication cost is high, the coefficient a1 may be increased or the coefficient a2 may be decreased so that the difference update data file Ma is more likely to be selected as the first supply data file fa1. On the other hand, when the volume of data is small and the communication cost is low, the coefficient a1 may be decreased or the coefficient a2 may be increased so that the overwrite update data file Mc is more likely to be selected as the first supply data file fa1.

Alternatively, the update time determination unit 15 may not perform comparison processing, and instead the difference update data file Ma or the overwrite update data file Mc may be directly selected depending on the communication cost of the data supply method. In such case, if the communication cost of the data supply method is greater than or equal to a prescribed threshold, the difference update data file Ma may be extracted as the first supply data file fa1 for all the request update sections 23; and if the communication cost is less than the prescribed threshold, the overwrite update data file Mc may be extracted as the first supply data file fa1 for all the request update sections 23.

Next, an outline of an operation and effect of the present embodiment will be given using the examples shown in FIGS. 13A, 13B, 24A, and 24B.

Figure 13A:
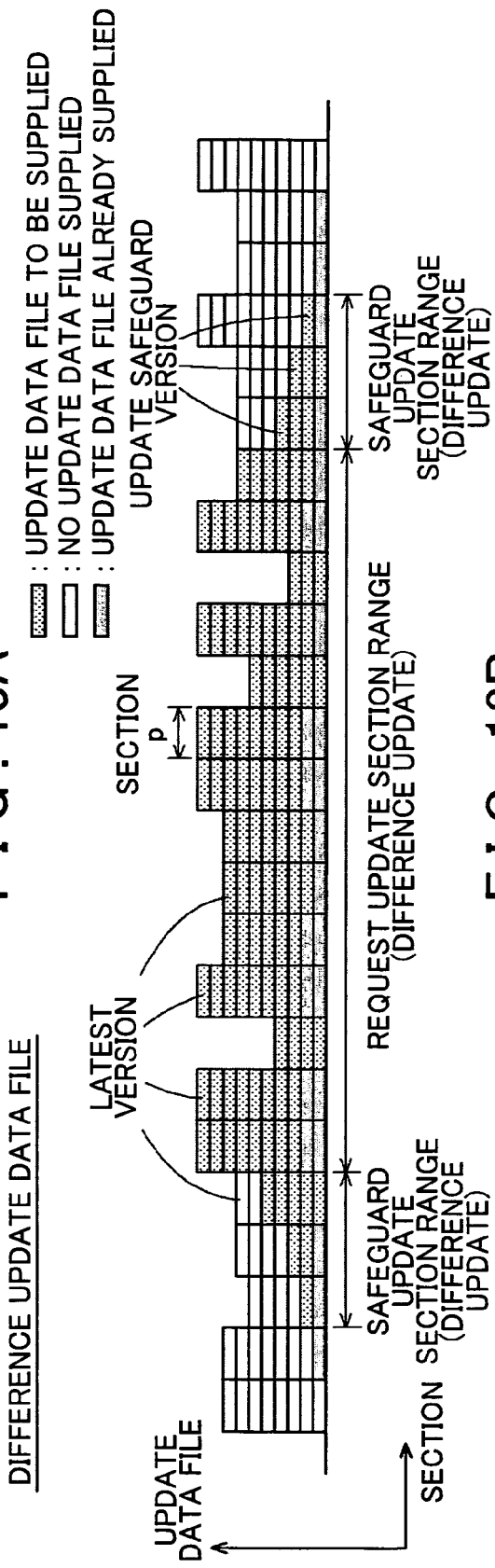
FIGS. 13A and 13B are explanatory drawings for explaining an operation and effect of the embodiment of the present invention.
Figure 13B:
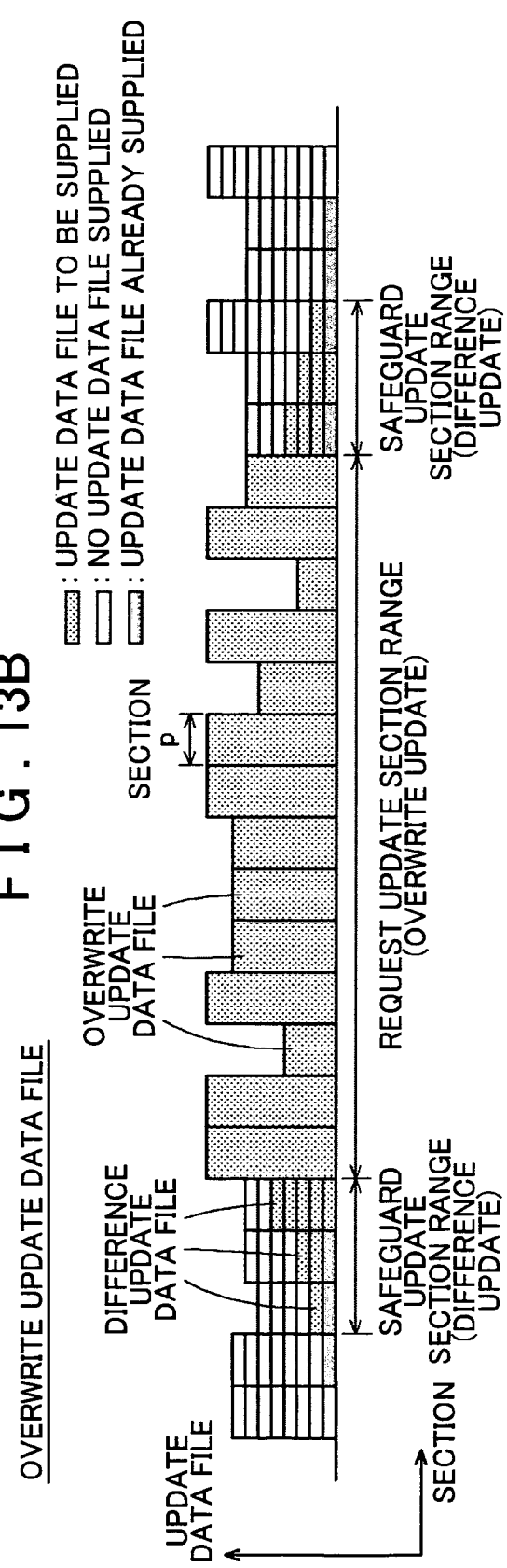

FIG. 13A shows an example (for a difference update data file) in which all versions up to the latest version of the difference update data file Ma are extracted as the first supply data file fa1 for all the request update sections 23. FIG. 13B shows an example (for an overwrite update data file) in which the overwrite update data file Mc is extracted as the first supply data file fa1 for all the request update sections 23.

In the example of FIG. 13A, for each request update section 23 of the request update section range 22 extracted based on the update request fb, all versions up to the latest version of the update data file Ma, which are newer than the already supplied update data file, are extracted as an update data file to be supplied. However, there are many versions of the difference update data file Ma to be supplied for each request update section 23. As described above, the processing to perform difference updating within the navigation device 2 is processing that successively determines the update content per data unit and rewrites the map data, and has a long update processing time as a consequence. Accordingly, if there are many versions to be supplied as in the example of FIG. 13A, the update time for updating the map data in the navigation device 2 considerably increases.

Meanwhile, in each safeguard update section 24 of the surrounding safeguard update section ranges to be updated for network safeguarding, the safeguard update data extraction unit 11 that will be described later uses the difference update data file Ma to keep the number of versions that pertain to updating the safeguard update section ranges and the safeguard update sections to the minimum required. This is for the following reason. Rather than up to the latest version of the difference update data file Ma, the difference update data file Ma up to an update safeguard version that needs updating to safeguard the road network is extracted and supplied. Therefore, the update safeguard version uva becomes increasingly older than the latest version the farther the section is from the request update section range, and the section range in which the safeguard update sections spread out in a chain manner can thus be narrowed.

Meanwhile, in the example of FIG. 13B, the latest version of the overwrite update data file Mc is extracted and supplied for each request update section 23 of the request update section range 22.

Thus, as in FIG. 13A, even if there are many versions that pertain to the update of each request update section 23, the volume of data to be supplied does not significantly fluctuate and the data distribution time can be stabilized. As described above, this is because the overwrite update data file Mc includes all data constituting the map data Mb of the section p and there is little fluctuation in the volume of data compared to difference data. In addition, an update of the map data Mb in the navigation device 2 is simply executed by performing processing that uses the supplied overwrite update data file Mc for the section p to replace (overwrite update) the map data Mb of the corresponding section p. Therefore, compared to the difference update processing of FIG. 13A, the update processing time within the navigation device 2 can be considerably shortened. In particular, when there are many versions of data to be supplied, the overwrite update processing time is short and stabilized in contrast to the difference update processing time that considerably increases.

Accordingly, the update time for updating the map data Mb in the navigation device 2 when the overwrite update data file Mc is supplied for the request update section 23 does not considerably increase compared to when difference update data is supplied, and can remain stable. Thus, the map update of the navigation device 2 can have enhanced user-friendliness, and the system design of the map data supply system can be simplified.

As explained using the example of FIG. 13A, for the safeguard update section 24, the safeguard update data extraction unit 11 that will be described later uses the difference update data file Ma to keep the number of versions that pertain to updating the safeguard update section ranges and the safeguard update sections to the minimum required. Consequently, the volume of update data for network safeguarding can be suppressed and the update time can also be reduced. In addition, road network connections can be safeguarded as well.

Accordingly, the update time for updating the map data in the navigation device 2 when the overwrite update data file Mc is supplied for each request update section 24 does not considerably increase compared to when difference update data is supplied, and can remain stable. Thus, the map update of the navigation device 2 can have enhanced user-friendliness, and the system design of the map data supply system can be simplified.

FIG. 24A is the same as FIG. 13A, and shows an example (for a difference update data file) in which all versions up to the latest version of the difference update data file Ma are extracted as the first supply data file fa1 for all the request update sections 23. FIG. 24B shows an example (for an overwrite or difference update data file) in which, depending on the result of comparing the prescribed index related to update time, either the overwrite update data file Mc or all versions up to the latest version of the difference update data file Ma are extracted as the first supply data file fa1 for the request update section 23.

In FIG. 24B, the overwrite update data file Mc and the difference update data file Ma for each request update section 24 are compared based on the prescribed index related to update time, and either the overwrite update data file Mc or the difference update data file Ma is extracted and supplied so as to shorten the time for updating the map data Mb in the navigation device 2.

In the example of FIG. 24B, a difference update data file is extracted for the request update section 23 that has a small number of versions pertaining to updating, thus suppressing an increase in the update processing time of the navigation device 2 and reducing the distribution time. Accordingly, compared to the example of FIG. 13B, the update times of the request update sections 23 can be further shortened, and an even shorter update time overall can be achieved.

It should be noted that instead of making a determination strictly in terms of time, a determination may be made using an index that also takes into account indices such as the economy and convenience related to update time. Such a determination would enable improved economy and convenience of the update data supply device 1, as well as greater user satisfaction.

2-5-5. Safeguard Update Data Extraction Unit 11

The safeguard update data extraction unit 11 performs processing that extracts the safeguard update section 24, which is a particular section p that needs updating to safeguard a road network connection between adjacent sections p, when all the request update sections 23 are updated using the overwrite update data file Mc, that is, updated to the latest version. The safeguard update data extraction unit 11 also performs processing that extracts for each safeguard update section 24 the difference update data file Ma up to the update safeguard version uva, which is a particular version that needs updating to safeguard a road network connection, as the second supply data file fa2 to be supplied to the navigation device 2.

Updating a particular safeguard update section 24 creates a need to update the section p adjacent to that safeguard update section 24 for network safeguarding, and causes the safeguard update sections 24 to spread out in a chain manner. However, in the present embodiment, for the update of the safeguard update section 24, rather than the latest version of the overwrite update data file Mc and up to the latest version of the difference update data file Ma, the safeguard update data extraction unit 11 extracts the difference update data file Ma up to the update safeguard version uva, which is a version that needs updating to safeguard the road network. Therefore, the update safeguard version uva of each section p becomes increasingly older than the latest version the farther the section p is from the request update section range 22, and the section range in which the safeguard update sections 24 spread out in a chain manner can thus be narrowed.

In the present embodiment, an adjacent section group is a section group that is formed of an extraction update section 31 that is an extracted update section, and an adjacent section 26 next to that particular extraction update section 31. The safeguard update data extraction unit 11 extracts the safeguard update section 24 from the adjacent section 26 by searching the safeguard version table SVT for the adjacent section group based on the newest update version. In addition, the safeguard update data extraction unit 11 extracts the update safeguard version uva for each safeguard update section 24, and extracts up to the update safeguard version uva of the difference update data file Ma.

More specifically, in the present embodiment, an adjacent section group is the section group g that is formed of: the extraction update section 31, which is an update section extracted by the request update data extraction unit 10 or the safeguard update data extraction unit 11; and an adjacent section 26, which is the section p that is adjacent to that particular extraction update section 31. The safeguard version table SVT is searched for the adjacent section group. The adjacent section group is extracted if there are any safeguard versions va of the extraction update section 31 of the adjacent section group that are newer than the current version and respectively match versions up to a post-update version (the latest version of the update request section 23, or the newest update safeguard version uva of the safeguard update section 24). The adjacent section 26 of the extracted adjacent section group is then extracted as the safeguard update section 24. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

Here, the current version of the section p is extracted from the management data table DT of the navigation device 2, and the latest version of the section p is extracted from the version table VT.

It should also be noted that the post-update version is the newest version among the versions of the update data file supplied for the section p.

Processing is subsequently performed that sets a newly extracted safeguard update section 24, and an already extracted safeguard update section 24 from which a newer update safeguard version uva is extracted as extraction update sections 31 that are extracted update sections. The newest safeguard version uva of each extraction update section 31 is set as the post-update version. As described above, an adjacent section group is extracted again, and the safeguard update section 24 and the update safeguard version uva are extracted. This recursive extraction processing is repeatedly executed until no newer update safeguard versions uva are extracted from the new safeguard update section 24 and the already extracted safeguard update section 24, and the safeguard update sections 24 spreading out in a chain manner and the update safeguard versions uva thereof are extracted. Processing is next performed that, for the safeguard update section 24 for which a plurality of update safeguard versions uva is extracted, sets the newest update safeguard version uva as the final update safeguard version uva of that particular safeguard update section 24, and extracts the update data file.

Note that the processing that extracts the safeguard update section 24 and the update safeguard version uva thereof is not limited to processing in which the request update section 23 is set as the extraction update section 31, and may be used in more general processing that extracts the safeguard update section 24 and the update safeguard version uva to safeguard a surrounding network of a prescribed section p to be updated to a prescribed version, which is set as the extraction update section 31.

According to such processing, the current and older safeguard versions va are already supplied and the network safeguarded. Since there is no need to update for network safeguarding, the update safeguard version uva newer than the current version is extracted. In addition, the update safeguard version uva is extracted based on the latest safeguard version va out of the safeguard versions va respectively matching all versions up to the newest version (post-update version) among the supplied versions. Accordingly, if the request update section 23 is updated to the latest version, the update safeguard version uva is set as a version that needs updating to safeguard a road network connection between adjacent sections. Since the adjacent section 26 for which such an update safeguard version uva exists is extracted as the safeguard update section 24, if the request update section 23 is updated to the latest version, the safeguard update section 24 becomes a section that needs updating to safeguard a road network connection between adjacent sections.

In the present embodiment, first, the request update section 23 that is an update section extracted by the request update data extraction unit 10 is set as the extraction update section 31. An adjacent section group is extracted that is the section group g formed of the extraction update section 31 and the section p, which is adjacent to the extraction update section 31 and not a separate request update section 23. Accordingly, an end request update section 25, which is at least one request update section 23 positioned at an end of the request update section range 22, is set as the extraction update section 31. The adjacent section 26 is the section p that is not a request update section 23, and is adjacent to the end request update section 25. The section group g is formed of the extraction update section 31 and the adjacent section 26, and is extracted as an adjacent section group. The safeguard version table SVT is searched for the adjacent section group. The adjacent section 26 of the adjacent section group is extracted as the safeguard update section 24 if there are any safeguard versions va of the extraction update section 31 of the adjacent section group that are newer than the current version and respectively match versions up to the latest version. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

In the example shown in FIG. 9A, the section A1 is set as the end request update section 25 and the extraction update section 31 of the request update section 23. The section A2 is extracted as the adjacent section 26. The section group g formed of the section A1 and the section A2 is extracted as an adjacent section group. Here, as shown in FIG. 9B, the current versions of the sections A1, A2, A3, and A4 are 1, 1, 2, and 2, respectively, and the latest versions are 8, 6, 6, and 5, respectively. The safeguard version table SVT shown in FIG. 9C is searched for the adjacent section group formed of the section A1 and the section A2. A determination is made regarding whether there are any safeguard versions va of the section A1, which is the extraction update section 31 of the adjacent section group, that are newer than the current version 1 and respectively match versions 2 to 8 up to the latest version 8. As shown in FIG. 9C, the safeguard versions for the section A1 are 1, 3, 5, and 7. The versions 3, 5, and 7 match. Therefore, the section A2 that is the adjacent section 26 of the adjacent section group is extracted as the safeguard update section 24. The safeguard version va of 5 of the adjacent section 26 that corresponds as a safeguard version group to the latest safeguard version va of 7 among the matching safeguard versions va of 3, 5, and 7 of the extraction update section 31, i.e., section A1, is extracted as the update safeguard version uva of the safeguard update section 24. In other words, the section A2 is extracted as the safeguard update section 24, and the update safeguard version uva of the section A2 is 5.

Updating the safeguard update section 24 extracted from the adjacent section 26 up to the update safeguard version uva creates a need to also update the section p adjacent to this safeguard update section 24 for network safeguarding, and causes the safeguard update sections 24 to spread out in a chain manner. The safeguard update data extraction unit 11 extracts the safeguard update sections 24 spreading out in a chain manner, and also extracts the update safeguard version uva of each safeguard update section 24.

For this reason, next, the extracted safeguard update section 24 is set as the extraction update section 31, which is an extracted update section. The section p adjacent to that particular update section 31 is extracted as the adjacent section 26. The section g formed of the extraction update section 31 and the adjacent section 26 is extracted as an adjacent section group. The safeguard version table SVT is searched for the adjacent section group. The adjacent section 26 of the adjacent section group is extracted as the safeguard update section 24 if there are any safeguard versions va of the extraction update section 31 that are newer than the current version and respectively match versions up to the update safeguard version uva. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

Processing is performed that sets a newly extracted safeguard update section 24, and an already extracted safeguard update section 24 from which a newer update safeguard version uva is extracted as extraction update sections 31 that are extracted update sections. Adjacent section groups thereof are then extracted, and the safeguard update section 24 and the update safeguard version uva are similarly extracted. Such processing is repeated until no newer update safeguard versions uva are extracted from the new safeguard update section 24 and the already extracted safeguard update section 24, and the safeguard update sections 24 spreading out in a chain manner and the update safeguard versions uva thereof are extracted.

Thus, using as a basis the safeguard version va that matches versions up to the update safeguard version uva of an extraction safeguard update section, i.e., the extracted safeguard update section 24, the safeguard update data extraction unit 11 extracts the update safeguard version uva of the safeguard update section 24 adjacent to the extraction safeguard update section and extracted in a chain manner. Therefore, the safeguard version va used as a basis becomes at least older than the update safeguard version uva of the extraction safeguard update section. Consequently, the update safeguard version uva extracted in a chain manner becomes increasingly older than the latest version the farther the section p is from the request update section range 22, and the section range in which the safeguard update sections 24 spread out in a chain manner can thus be narrowed.

Alternatively, using as a basis the safeguard version va that matches a version newer than the current version, the safeguard update data extraction unit 11 extracts the update safeguard version uva of the safeguard update section 24 adjacent to the extraction safeguard update section and extracted in a chain manner. Therefore, the safeguard version va used as a basis becomes at least newer than the current version of the extraction safeguard update section. Consequently, the update safeguard version uva extracted in a chain manner is limited to a version newer than the current version, and the section range in which the safeguard update sections 24 spread out in a chain manner can thus be narrowed.

In the example shown in FIG. 9A, the section A2 that is the extracted safeguard update section 24 is set as the extraction update section 31. The section A3 is extracted as the adjacent section 26. The section group g formed of the section A2 and the section A3 is extracted as an adjacent section group. The safeguard version table SVT shown in FIG. 9C is searched for the adjacent section group formed of the section A2 and the section A3. A determination is made regarding whether there are any safeguard versions va of the section A2, which is the extraction update section 31 of the adjacent section group, that are newer than the current version 1 and respectively match versions 2 to 5 up to 5, which is the update safeguard version uva of the section A2. As shown in FIG. 9C, the safeguard versions for the section A2 are 1, 4, and 6. The version 4 matches. Therefore, the section A3 that is the adjacent section 26 of the adjacent section group is extracted as the safeguard update section 24. Given the matching safeguard version va of 4, the safeguard version va of 3 of the adjacent section 26 that corresponds as a safeguard version group to the latest safeguard version va of 4 of the extraction update section 31 is extracted as the update safeguard version uva of the safeguard update section 24. In other words, the section A3 is extracted as the safeguard update section 24, and the update safeguard version uva of the section A3 is 3.

Next, the section A3, which is the extracted safeguard update section 24, is set as the extraction update section 31.

The section A4 is extracted as the adjacent section 26. The section g formed of the section A3 and the section A4 is extracted as an adjacent section group, and similarly, the safeguard update section 24 and the update safeguard version uva are extracted. In other words, the safeguard version table SVT shown in FIG. 9C is searched for the adjacent section group formed of the section A3 and the section A4. A determination is made regarding whether there are any safeguard versions va of the section A3, which is the extraction update section 31 of the adjacent section group, that are newer than the current version 2 and respectively match versions up to 3, which is the update safeguard version uva of the section A3. As shown in FIG. 9C, the safeguard versions for the section A3 are 2, 4, and 5. No version matches, and therefore, the safeguard update section 24 is not extracted. In the example shown in FIG. 9A, there are no other adjacent section groups, so the processing to extract the safeguard update section 24 and the update safeguard version uva is ended.

Accordingly, in the example shown in FIGS. 9A to 9C, the sections A2 and A3 are extracted as safeguard update sections 24, and the update safeguard versions uva of 5 and 3 are respectively extracted. As shown in FIGS. 9A to 9C and FIG. 10, the update safeguard version uva of each section p becomes increasingly older than the latest version the farther the section p is from the request update section range 22. In addition, the update safeguard version uva of each section p is limited to a version newer than the current version, so the section range in which the safeguard sections 24 spread out in a chain manner can be narrowed.

Meanwhile, in the case where the adjacent section 26 of the adjacent section group is extracted as the safeguard update section 24 if there are any safeguard versions va that match all versions up to the latest version, rather than up to the post-update version as in the present embodiment, the section A4 in the example shown in FIGS. 9A to 9C and FIG. 10 is also set as the safeguard update section 24, and the section range in which the safeguard update sections 24 spread out in a chain manner becomes broader than that of the present embodiment.

Further, according to the present embodiment, the safeguard update data extraction unit 11 extracts all versions of the difference update data file Ma that are newer than the current version up to the update safeguard version uva for each safeguard update section 24.

The map update data supply device 1 is thus able to suppress the duplication and extraction of versions already supplied to each navigation device 2. Therefore, the volume of data and number of difference update data files Ma to be supplied depending on the navigation device 2 can be minimized.

2-5-6. Integrated Data Generation Unit 12

The integrated data generation unit 12 performs processing that integrates per request update section 23 all versions up to the latest version of the difference update data file Ma for each request update section 23 extracted by the request update data extraction unit 10, and generates the request update integrated data file 33 that serves as a data file for one difference update. In addition, the integrated data generation unit 12 performs processing that integrates per safeguard update section 24 the versions up to the update safeguard version uva of the difference update data file Ma for each safeguard update section 24 extracted by the safeguard update data extraction unit 11, and generates the safeguard update integrated data file 34 that serves as a data file for one difference update.

In other words, for each request update section 23 and safeguard update section 24, a plurality of versions of the difference update data file Ma for difference updating up to the latest version or the update safeguard version uva is integrated per section p, and a data file for one difference update is generated and supplied to the navigation device 2. Thus, compared to supplying a plurality of versions of the difference update data file Ma unchanged, the volume of data and the number of data files to be supplied can be reduced.

More specifically, in the present embodiment, the integrated data generation unit 12 targets all versions of the difference update data file Ma extracted for the section p. For example, the integrated data generation unit 12 integrates a plurality of versions of update data, wherein a data unit DU that did not exist before an update is added and ultimately deleted, such that an update of that particular data unit DU is not performed (an integration pattern for no integrated data). In addition, a plurality of versions of update data, wherein the content of a data unit DU that existed before an update is modified and ultimately deleted, is integrated as one piece of data for performing an update that deletes that particular data unit DU (an integration pattern for deletion). A plurality of versions of update data, wherein a data unit DU that did not exist before an update is added and has its content modified, is integrated as one piece of data for performing an update that adds that particular data unit DU (an integration pattern for addition). A plurality of versions of update data, wherein a data unit DU that existed before an update is ultimately modified, is integrated as one piece of modification update data (an integration pattern for modification).

A specific integration process of update data will be described below.

In the present embodiment, the integrated data generation unit 12 performs processing that extracts all the update sections, that is, all the request update sections 23 and safeguard update sections 24; and generates per extracted update section the request update integrated data file 33 and the safeguard update integrated data file 34, which are data files for performing one difference update and which integrate all versions of the difference update data file Ma to be supplied. This integration processing extracts per update section all identification codes that exist for all update versions of the difference update data file Ma to be supplied, and extracts per extracted identification code all existing update versions of update data. The integrated data generation unit 12 then performs processing that determines the integration pattern of all update data for each identification code, in consideration of the significance of an update history that spans all update versions and is a history of addition, modification, and deletion update content; and integrates all update data for the identification code as one piece of any one of addition, modification, and deletion update data, or as without update data. For each update section, the integrated data generation unit 12 generates one difference update data file of the post-integration update data generated for each identification code.

Next, the specific processes of integration pattern determination processing and integrated data generation processing based on an addition, modification, and deletion update history per identification code will be described.

Referring to Cases 1 to 3 of FIGS. 11 and 12, among all the update data that exists for each identification code, the first update content that is the update content of the oldest version of update data is an addition; and the last update content that is the update content of the newest version of update data is a deletion. In such case, as described above, the plurality of versions of update data add a data unit DU that did not exist before an update and ultimately delete the data unit DU. Processing is thus performed to integrate the plurality of versions of update data such that the data unit DU of that particular identification code is not updated (the integration pattern for no integrated data). In other words, for that identification code, none of the plurality of versions of update data are added to the integrated data file.

Meanwhile, referring to Cases 4 and 5 of FIG. 12, the first update content is a modification and the last update content is a deletion for each identification code. In such case, as described above, the plurality of versions of update data modify the content of a data unit DU that existed before an update and ultimately delete the data unit DU. Processing is thus performed that integrates the plurality of versions of update data as one piece of deletion update data for performing an update that deletes that particular data unit DU (an integration pattern for deletion). In the present embodiment, processing is performed to generate deletion update data for only that particular identification code.

Referring to Cases 9 and 10 of FIG. 12, the first update content is an addition and the last update content is a modification for each identification code. In such case, as described above, the plurality of versions of update data add a data unit DU that did not exist before an update and modify its content. Processing is thus performed that integrates the plurality of versions of update data as one piece of addition update data for performing an update that adds that particular data unit DU (an integration pattern for addition). In the present embodiment, processing is performed that subjects the first addition update data, which includes the attribute data of all data items required for constituting one data unit DU, to difference updates using each version of update data in the order of older version first, starting from the second oldest version of update data among the respective update data that exists for each identification code up to the newest version of update data; and generates addition update data that is the integrated update data after such difference updating of the update data. Such difference updating is executed by updating the pre-update data of each data item that pertains to a modification of the update data to the post-update data. In the present example, only data items for which there is an update are difference updated using the update yes/no flag data included in the modification update data. Using the update yes/no flag shortens the generation time of the integrated update data.

In the road data example of the present embodiment, the modification update data, regardless of whether there is a modification of each data item, includes the data of all data items with a potential to be updated, except for the start point intersection ID and the end point intersection ID. Therefore, the difference updating described above is not performed, and the integrated addition update data is generated using the data of all data items except for the intersection IDs in the last update data. In other words, processing is performed to generate addition update data that is constituted from the identification code; the start point intersection ID and the end point intersection ID included in the first update data that is addition update data; and all data items except for the intersection IDs of the last update data that is modification update data. There is no need to perform a difference update for each data item, so the generation time of the integrated update data can be shortened. Further, in the present example, a modification of the road data that changes the start point intersection ID or the end point intersection ID becomes a deletion and addition of the road data with the changed identification code. Therefore, the intersection IDs of all update data for each identification code are not modified and remain uniform. Accordingly, there is no need to search all update data for each identification code and extract the intersection ID, and the start point intersection ID and the end point intersection ID included in the addition update data that is the first update data is used in the integrated update data. Therefore, the generation time of the integrated update data can be shortened.

Referring to Case 8 of FIG. 12, the first update content is a modification and the last update content is a modification for the identification code. In such case, as described above, the plurality of versions of update data ultimately modify a data unit DU that existed before an update. Processing is thus performed that integrates the plurality of versions of update data as one piece of modification update data for performing an update that modifies that particular data unit DU (an integration pattern for modification).

In the present embodiment, processing is performed that subjects the first modification update data to difference updates using each version of update data in the order of older version first, starting from the second oldest version of update data among the respective update data that exists for each identification code up to the newest version of update data; and generates modification update data that is the integrated update data after such difference updating of the update data. Such difference updating is executed by updating the pre-update data of each data item that pertains to a modification of the update data to the post-update data. If no pre-update data exists for a data item subject to a modification, data for the post-modification data item is added and updated. In the present example, only a data item for which there is an update is difference updated using the update yes/no flag data included in the modification update data. Using the update yes/no flag shortens the generation time of the integrated update data.

In the road data example of the present embodiment, as described above, regardless of whether there is a modification of each data item, the modification update data includes the data of all data items with a potential to be updated, except for the start point intersection ID and the end point intersection ID. Therefore, the difference updating described above is not performed, and the integrated modification update data is generated using the data of all data items except for the intersection IDs in the last update data. With regard to the update yes/no flag, an update yes/no flag that is the product of searching per data item the update yes/no flags of all update data for each identification code and setting data items with at least one update as having an update (ORing (merging) all flags for each data item with respect to having an update) is used as an integrated modification update flag. Note that when there are deletions and additions (when there is update data without an update yes/no flag) in versions between the first and last versions of update data, an update yes/no flag that indicates all data items as having an update is used in the integrated update data. In the case of such additions and deletions as well, as described above, the start point intersection ID and the end point intersection ID are not modified. Therefore, the intersection IDs can be excluded from the integrated update data and the modification update data used.

In other words, processing is performed to generate modification update data that is constituted from the identification code; all data items except for the intersection IDs of the last update data that is the modification update data; and the merged update yes/no flag. There is no need to perform a difference update for each data item, so the generation time of the integrated update data can be shortened. In addition, the processing load for flag merging is considerably smaller than that for difference updating the data of each data item.

Thus, the integration pattern can be determined by simply determining the first and last update content of all update data for the identification code, which reduces the integration processing computation load. Similar to the road data of the present embodiment, the modification update data includes the data of all data items with a potential to be updated. There is thus no need to perform a difference update of all versions of the update data to generate the integrated update data. Accordingly, the last update data can be set unchanged as the data of the integrated update data, thus reducing the integration processing computation load and shortening the update data supply time.

The update data stored in the update database DB1 that is pre-integration update data is constituted so as to include the data of all data items with a potential to be updated. Conversion processing is performed so that the integrated update data format includes the data of only the data items to be updated instead of all data items. An integrated data file may be constituted from the post-conversion processing update data and supplied to the navigation device 2. During such conversion processing, the update yes/no flag can be used to extract the data items to be updated, so the conversion processing computation load can be kept low. With such a configuration, there is no need for difference updating as described above in the integration processing performed within the map update data supply device 1. Therefore, the integration processing computation load can be reduced and the update data supply time shortened. Meanwhile, the volume of update data to be supplied can be decreased, and a reduction in the distribution time and communication cost can also be achieved.

Next, using the examples shown in FIGS. 11 and 12, a reduction effect on the supply data size that is achieved by integrating the plurality of versions of update data for a particular identification code will be described. Here, especially crucial road data will be used as an example in the following description.

FIG. 11 is a drawing that explains a reduction in the supply data size that is achieved by integration processing, based on an integration pattern (integration pattern for no integrated data) that integrates a plurality of versions of update data, wherein a data unit DU of a particular identification code that did not exist before an update is added and ultimately deleted, such that an update of that particular data unit DU is not performed. In the example of FIG. 11, the map data Mb in the navigation device 2 before an update is initial data, and the data unit DU of the road data with an identification code 10 (ID: 10) does not exist. After the map data supply device 1 receives the update request fb from the navigation device 2, the map data supply device 1 extracts versions 1 to 3 of addition, modification, and deletion update data for the identification code 10, and supplies all extracted update data information to the navigation device 2.

The respective data sizes of the addition, modification, and deletion update data, which are respective update versions of update data, are 24, 16, and 4 bytes, as mentioned earlier. If integration processing according to the present embodiment is not performed, it is necessary to transmit each update version of all the update data. The transmission data has a total data size of 44 bytes, and constitutes update data for three difference updates. However, if integration processing according to the present embodiment is performed, the update data for the identification code 10 is ultimately deleted after being added. Therefore, no update is performed. In other words, the plurality of versions of update data is integrated such that no update is performed, i.e., there is no update data. As a consequence, there is no update data to be transmitted and the data size is 0 bytes. Accordingly, integration processing achieves a considerable reduction in the volume of transmission data and the number of times difference update processing is performed in the navigation device 2.

Next, using the example shown in FIG. 12, the reduction effect on the supply data size that is achieved with each integration pattern will be described.

FIG. 12 shows, in a case where versions 1 to 4 are extracted as update versions, a history of update content for versions 1 to 4 of update data for a particular identification code, wherein examples of the update history that correspond to each integration pattern are shown in Cases 1 to 10. Specific update content is set per version as examples of combinations, wherein a circle (◯) indicates that an update of that particular update content is performed, and a dash (-) indicates that an update of all update content including that particular update content is not performed. Here, the update content of version 1 is an addition, version 2 is a modification, version 3 is a modification, and version 4 is a deletion.

Cases 1 to 3 illustrate the integration pattern (integration pattern for no integrated data) shown in FIG. 11 that integrates a plurality of versions of update data, wherein a data unit DU for a particular identification code that did not exist before an update is added and ultimately deleted, such that there is no update data. Cases 4 and 5 illustrate the integration pattern (integration pattern for deletion) that integrates a plurality of versions of update data, wherein a data unit DU for a particular identification code that existed before an update is modified and ultimately deleted, as one piece of deletion update data. Case 8 illustrates the integration pattern (integration pattern for modification) that integrates a plurality of versions of update data, wherein a data unit DU for a particular identification code that existed before an update is ultimately modified, as one piece of modification update data. Cases 9 and 10 illustrate the integration pattern (integration pattern for addition) shown in FIG. 11 that integrates a plurality of versions of update data, wherein a data unit DU for a particular identification code that did not exist before an update is added and ultimately modified, as one piece of addition update data. Note that, for comparison purposes, Cases 6, 7, and 11 only have one version of deletion, modification, and addition update data, respectively, and illustrate examples where integration is not necessary. In such cases, there is obviously no reduction effect on the supply data size.

The right half of the table in FIG. 12 shows the effect achieved based on whether integration processing is performed for each case. The right half of the table shows, in the case of no integration processing, the number of updates (quantity of update data to be supplied), i.e., the number of times processing for required difference updates is performed in the navigation device 2, and also shows the total data size of the update data to be supplied. In the case of integration processing, the update content of the one piece of update data to be generated, the number of updates, and the total data size is shown.

As shown in FIG. 12, performing integration processing achieves a considerable reduction in the number of updates (quantity of update data) and the total data size over all integration patterns. In addition, as evidenced by Cases 2, 5, and 10, a larger number of versions to be integrated results in a greater reduction effect. Accordingly, integration processing achieves a considerable reduction in the volume of transmission data and the number of times difference update processing is performed in the navigation device 2.

2-5-7. Communication Control Unit 14

The communication control unit 14 performs an operation control of the communication device 6. Specifically, the communication control unit 14 controls communication between the navigation device 2 and the map update data supply device 1 using the communication device 6, and causes the communication device 6 to perform operations for receiving the data of the update request fb transmitted from the navigation device 2, transmitting the first supply data file fa1 and the second supply data file fa2 to the navigation device 2, and the like. Thus, in the present embodiment, the communication control unit 14 and the communication device 6 constitute the integrated data supply unit 13 that supplies the first supply data file fa1 and the second supply data file fa2 to the navigation device 2.

3. Operation Processing of Map Update Data Supply Device 1

Next, the processing of the map update data supply device 1 that operates in accordance with the map update data supply program will be described based on flowcharts. The following processing performed by the units 7 to 15 provided in the map update data supply device 1 will be explained: processing that generates and supplies the first supply data file fa1 and the second supply data file fa2 in response to a map database DB3 update request from the navigation device 2; and during such processing, processing that extracts request update data, processing that compares the update times carried by overwrite and difference update data, processing that extracts safeguard update data, processing that generates integrated data from such update data, and processing that updates various databases.

3-1. First and Second Supply Data File Generation/Transmission Processing

Figure 15:
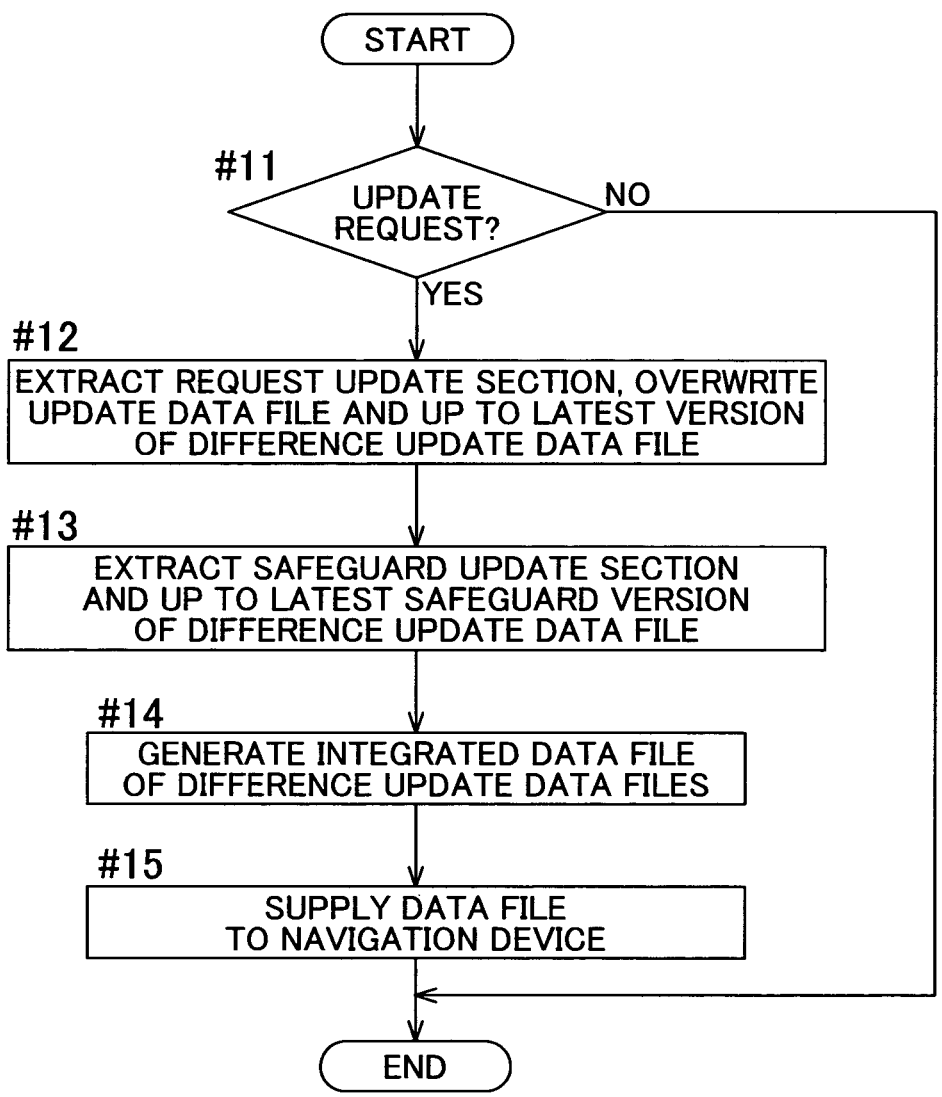
FIG. 15 is a flowchart that shows supply data file generation and transmission processing performed by the map update data supply device.

FIG. 15 is a flowchart that shows processing performed by the map update data supply device 1 to generate and supply the first supply data file fa1 and the second supply data file fa2. As shown in FIG. 15, if there is an update request from the navigation device 2, that is, if the map update data supply device 1 receives the update request fb (#11: Yes), the request update data extraction unit 10 performs processing to extract the request update section 23 based on the update request fb, and the overwrite update data file Mc and up to the latest version of the difference update data file Ma for the request update section 23 (#12).

Specifically, the processing at #12 extracts the request update section 23 based on the update request fb from the navigation device 2; compares the update times carried by the extracted overwrite update data file Mc and up to the latest version of the difference update data file Ma for each request update section 23; and extracts the data file that carries a shorter update time as the first supply data file fa1, which is a data file to be supplied to the navigation device 2. This processing will be described in more detail later based on a flowchart in FIG. 16.

Here, when a comparison of update times is made using the request update integrated data file 33, which integrates up to the latest version of the difference update data file Ma, as up to the latest version of the difference update data file Ma, processing to generate the request update integrated data file 33 that is performed by the integrated data generation unit 12 at #14 and described later is executed before the processing to compare update times.

Next, the map update data supply device 1 uses the safeguard update data extraction unit 11 to perform processing that extracts the safeguard update section 24 and the update safeguard version uva of the safeguard update section 24; and extracts up to the update safeguard version uva of the difference update data file Ma for the safeguard update section 24 as the second supply data file fa2, which is a data file to be supplied to the navigation device 2 (#13).

The processing at #13 extracts the safeguard update section 24, which is a particular section p that needs updating to safeguard a road network connection between adjacent sections p, when all the request update sections 23 are updated to the latest version; and extracts for each safeguard update section 24 the difference update data file Ma up to the update safeguard version uva, which is a particular version that needs updating to safeguard a road network connection. This processing will be described in more detail later based on a flowchart in FIG. 17.

The map update data supply device 1 subsequently uses the integrated data generation unit 12 to perform processing that generates the request update integrated data file 33 and the safeguard update integrated data file 34 (#14).

The processing integrates per request update section 23 all versions up to the latest version of the difference update data file Ma for each request update section 23 extracted by the request update data extraction unit 10, and generates the request update integrated data file 33 that serves as a data file for one difference update; and integrates per safeguard update section 24 the versions up to the update safeguard version uva of the difference update data file Ma for each safeguard update section 24 extracted by the safeguard update data extraction unit 11, and generates the safeguard update integrated data file 34 that serves as a data file for one difference update. This processing will be described in more detail later based on flowcharts in FIGS. 18 and 19.

Next, the map update data supply device 1 uses the communication control unit 14 and the communication device 6 that constitute the integrated data generation unit 13 to perform processing that supplies the first supply data file fa1 and the second supply data file fa2 to the navigation device 2 (#15). The first supply data file fa1 is constituted from the overwrite update data file Mc or the request update integrated data file 33 for the request update section 23. The second supply data file fa2 is constituted from the safeguard update integrated data file 34 for the safeguard update section 24. Thus, as described above, the first supply data file fa1 and the second supply data file fa2 are supplied to the navigation device 2.

3-2. Processing Performed by Request Update Data Extraction Unit 10 and Update Time Determination Unit 15

Figure 16:
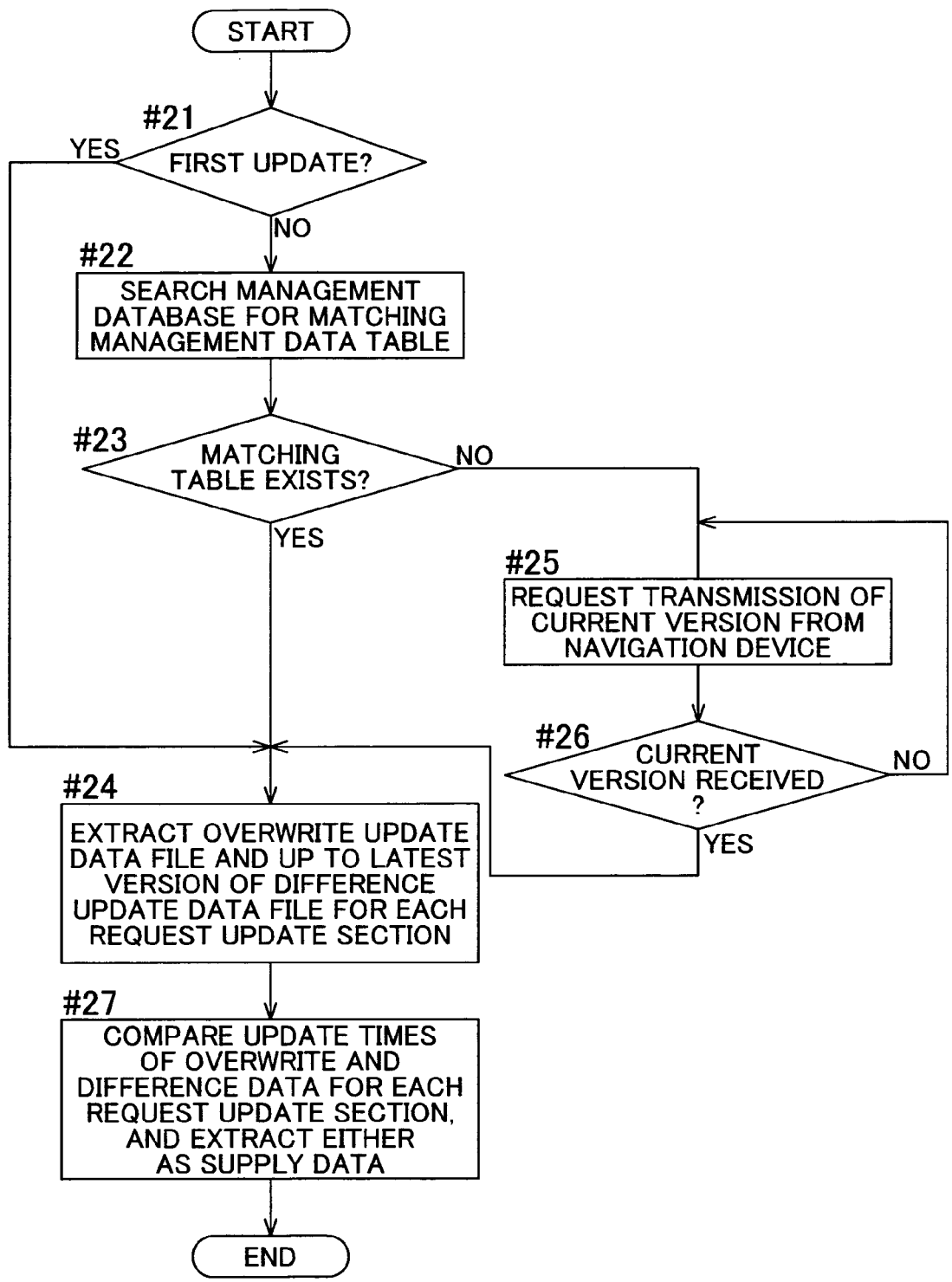
FIG. 16 is a flowchart that shows processing performed by a request update data extraction unit.

FIG. 16 is a flowchart that shows the processing performed by the request update data extraction unit 10 and the update time determination unit 15 at #12, wherein based on the update request fb, the update section 23 and up to the latest version of the difference update data file Ma for the request update section 23 are extracted.

First, as described above, the request update data extraction unit 10 performs processing to determine whether the update is a first update based on the update request fb from the navigation device 2 (#21). If not a first update (#21: No), the management database DB2 is searched for the management data table DT that matches the navigation device 2 that originated the update request fb, as described above (#22). If there is a matching management data table DT (#23: Yes), the current version of the request update section 23 is extracted from the management data table DT specified in the search.

The request update data extraction unit 10 subsequently performs processing to extract all versions of the difference update data file Ma that are newer than the current version, up to the latest version stored in the update map database DB1 (#24).

However, if the update is a first update (#21: Yes), the current version is set as the initial version (version 0) at #24, and the processing at #24 is performed to extract the difference update data file Ma.

In addition, if there is no matching management data table DT (#23: No), as described above, the map update data supply device 1 performs processing to request that the navigation device 2 that originated the update request fb transmit the current version already supplied to the navigation device 2 (#25). If the current version data is received from the navigation device 2 (#26: Yes), the processing at #24 is performed to extract the difference update data file Ma, based on the received current version.

As described above, the update time determination unit 15 then compares the overwrite update data file Mc and up to the latest version of the difference update data file Ma for each request update section 23 based on a prescribed index pertaining to update time, and determines which carries a shorter update time (#27). The request update data extraction unit 10 subsequently extracts as the first supply data file fa1, which is a data file to be supplied to the navigation device 2, either of the overwrite update data file Mc and up to the latest version of the difference update data file Ma determined by the update time determination unit 15 as carrying the shorter update time for each request update section 23 (#27).

Here, when a comparison of update times is made using the request update integrated data file 33, which integrates up to the latest version of the difference update data file Ma, in place of up to the latest version of the difference update data file Ma, processing to generate the request update integrated data file 33 that is performed by the integrated data generation unit 12 is executed before the processing to compare update times (#27) but after the processing to extract the difference update data file Ma (#24).

3-3. Processing Performed by Safeguard Update Data Extraction Unit 11

Figure 17:
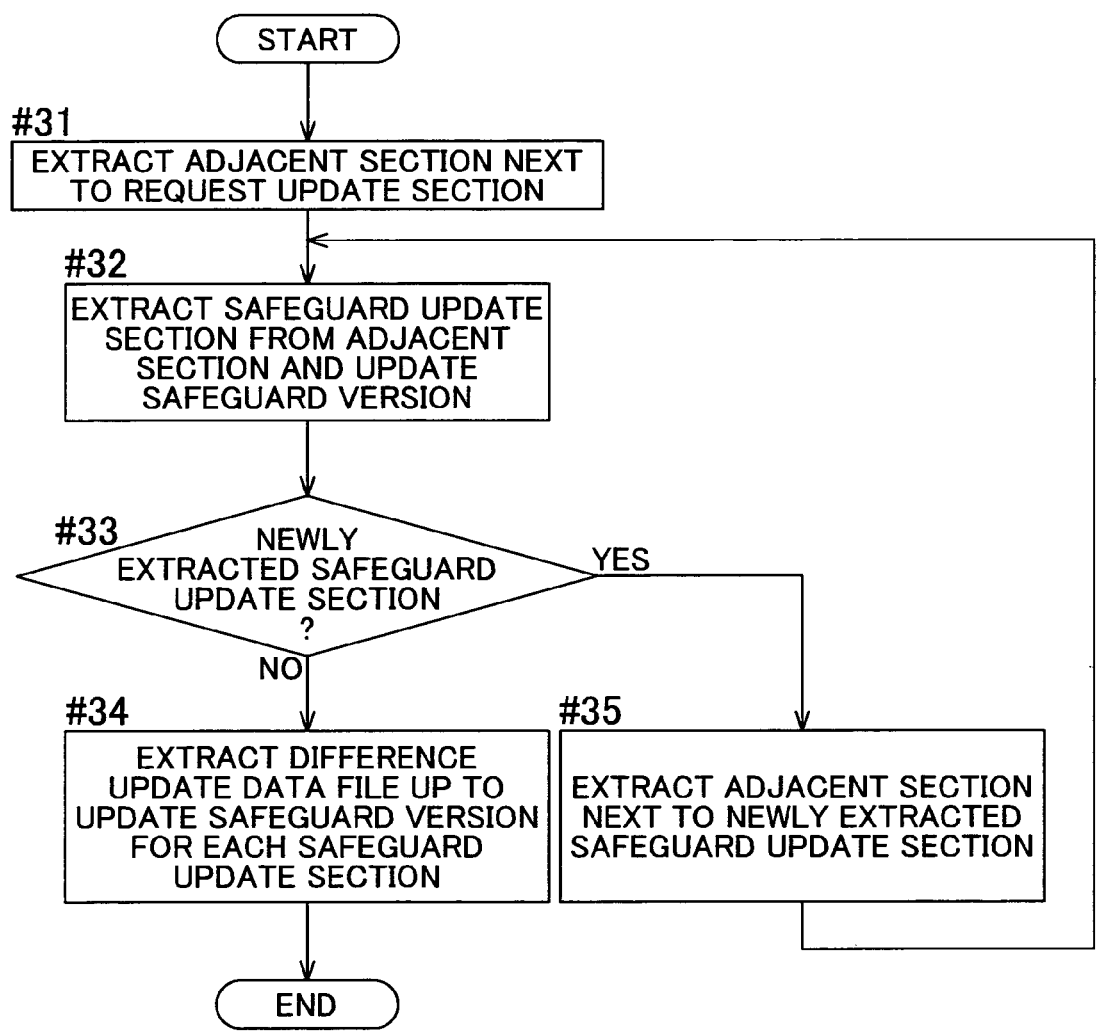
FIG. 17 is a flowchart that shows processing performed by a safeguard update data extraction unit.

FIG. 17 is a flowchart that shows the processing performed by the safeguard update data extraction unit 11 at #14, wherein the safeguard update section 24 and the update safeguard version uva of the safeguard update section 24 are extracted, and up to the update safeguard version uva of the difference update data file Ma for the safeguard update section 24 is extracted.

First, as described above, the safeguard update data extraction unit 11 performs processing to extract the adjacent section 26 next to the request update section range 22, which is a section range of the request update sections 23, and also extracts an adjacent section group 27 thereof (#31).

The safeguard update data extraction unit 11 subsequently performs processing to extract the safeguard update section 24 from the adjacent section 26 by searching for the extracted adjacent section group 27 in the safeguard version table SVT based on the newest update version, as described above; and extract the update safeguard version uva for each safeguard update section 24 (#32).

If a new safeguard update section 24 is extracted at #32 (#33: Yes), as described above, processing is performed to extract the adjacent section 26 next to the newly extracted safeguard update section 24, and the adjacent section group 27 thereof (#35). At #32 again, processing is performed to extract the safeguard update section 24 from the adjacent section 26 by searching for the adjacent section group 27 in the safeguard version table SVT based on the newest update version; and extract the update safeguard version uva for each safeguard update section 24. This recursive processing is repeatedly executed until no new safeguard update sections 24 and update safeguard versions uva are extracted, so that the safeguard update sections 24 spreading out in a chain manner and the update safeguard versions uva thereof are extracted.

If there are no longer any new safeguard update sections 24 or update safeguard versions uva to be extracted as described above (#33: No), processing is performed to extract up to the update safeguard version uva of the difference update data file Ma for the safeguard update section 24 (#34).

3-4. Processing Performed by Integrated Data Generation Unit 12

Figure 18:
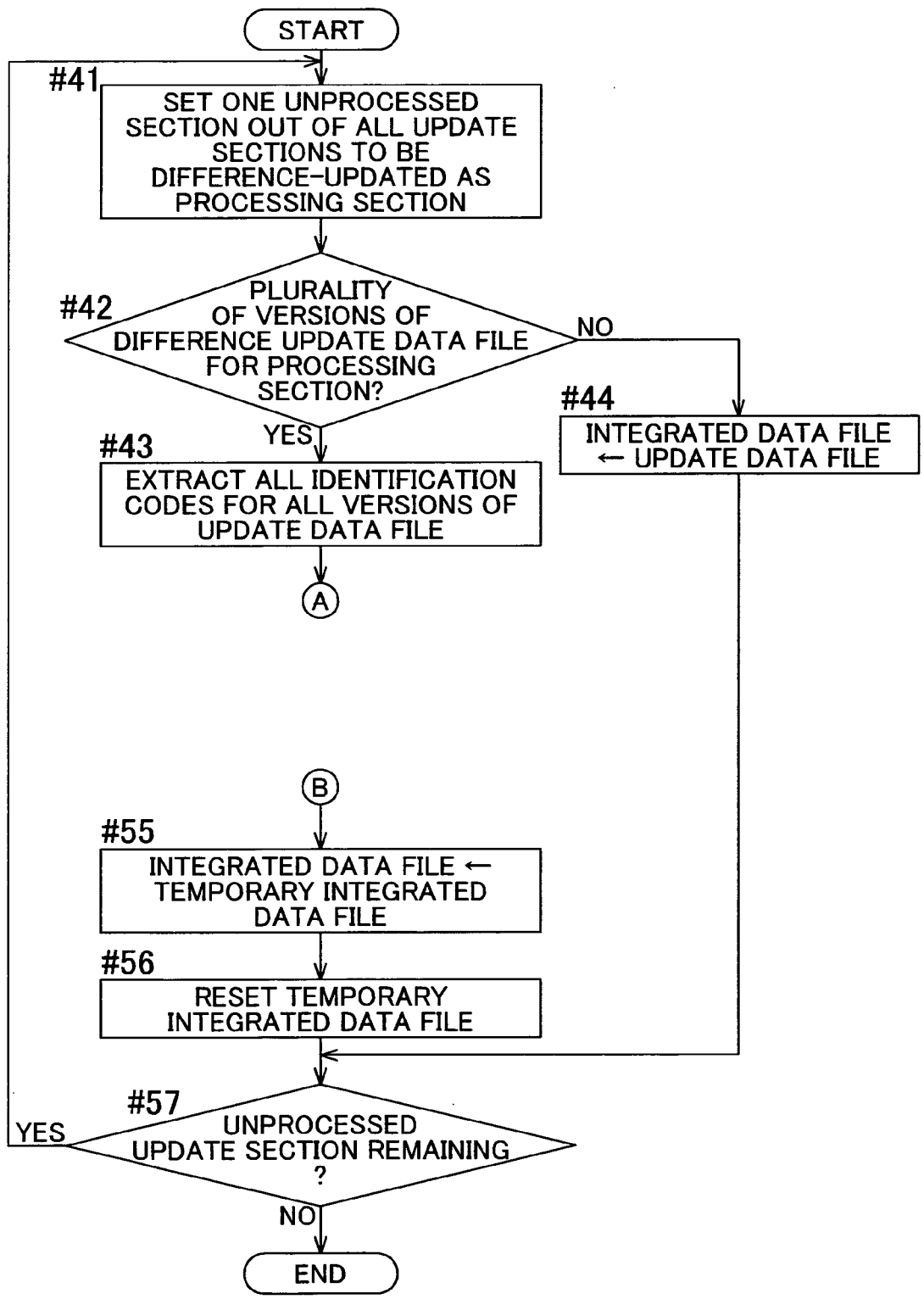
FIG. 18 is a flowchart that shows processing performed by an integrated data generation unit.
Figure 19:
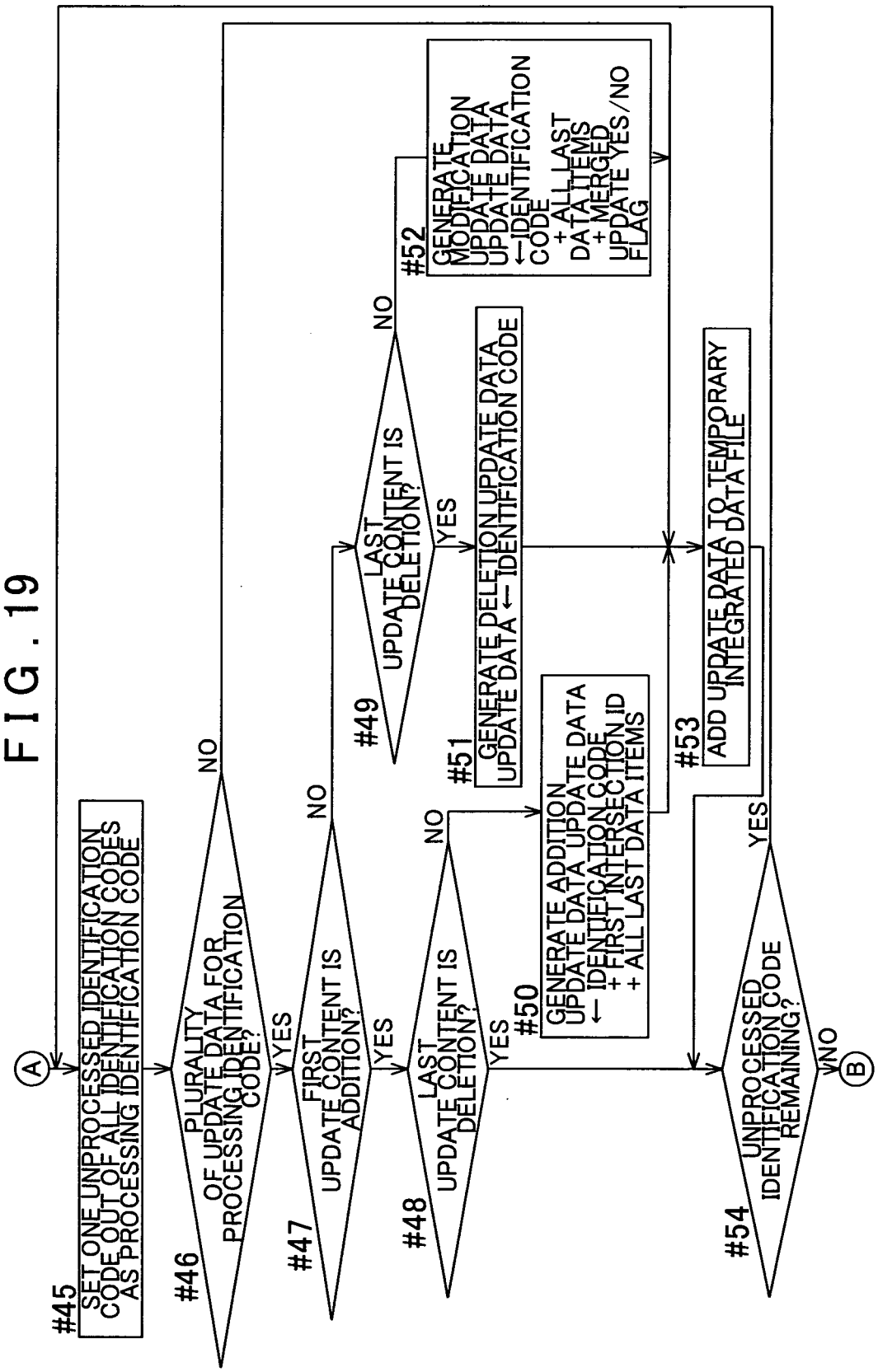
FIG. 19 is a flowchart that shows processing performed by the integrated data generation unit.

FIGS. 18 and 19 are flowcharts that show processing performed by the integrated data generation unit 12 at #15 to generate the request update integrated data file 33 and the safeguard update integrated data file 34. However, if update times are compared using the request update integrated data file 33 in place of up to the latest version of the difference update data file Ma at #12, the generation processing of the request update integrated data file 33 is performed at #12.

In these flowcharts, consideration is given to the significance of an update history that spans a plurality of versions of update data for performing additions, modifications, and deletions with respect to each data unit DU associated with an identification code in the present embodiment. Processing that integrates update data as one piece of any one of addition, modification and deletion update data, or as without update data will be described based on these flowcharts.

First, as described above, the integrated data generation unit 12 performs processing to set one update section out of all the request update sections 23 and safeguard update sections 24, which are update sections, as a processing section (#41).

If a plurality of versions of the difference update data file Ma exists for the set processing section (#42: Yes), processing is performed to extract all identification codes for which all update versions of the difference update data file Ma exist (#43).

Processing is then performed to set one identification code out of all the extracted identification codes as a processing identification code (#45). If update data for the set processing identification code exists throughout all update versions of the difference update data file Ma (#46: Yes), processing is performed to integrate the update data as described below (#47 to #52).

Among all the update data that exists for the processing identification code, if the first update content that is the update content of the oldest version of update data is an addition (#47: Yes), and the last update content that is the update content of the newest version of update data is a deletion (#48: Yes), the plurality of versions of update data add a data unit DU that did not exist before an update and ultimately delete the data unit DU, as described above. In such case, the update data is integrated such that the data unit DU of that particular identification code is not updated. In other words, none of the plurality of versions of update data for the processing identification code are added to a temporary integrated data file, which will ultimately become an integrated data file for the processing section, and the integration processing is ended.

If the first update content for the processing identification code is a modification (#47: No) and the last update content is a deletion (#51: No), the plurality of versions of update data modify the content of a data unit DU that existed before an update and ultimately delete the data unit DU, as described above. In such case, processing is performed that integrates the update data as one piece of deletion update data for performing an update that deletes that particular data unit DU (#51). In the present embodiment, processing is performed to generate deletion update data for only the processing identification code.

If the first update content for the processing identification code is an addition (#47: Yes) and the last update content is a modification (#48: No), the plurality of versions of update data add a data unit DU that did not exist before an update and modify its content, as described above. In such case, processing is performed that integrates the update data as one piece of addition update data for performing an update that adds that particular data unit DU (#50). In the road data example of the present embodiment, as described above, processing is performed to generate addition update data that is constituted from the processing identification code; the start point intersection ID and the end point intersection ID included in the first update data that is addition update data; and all data items except for the intersection IDs of the last update data that is modification update data (#50).

If the first update content for the processing identification code is a modification (#47: No) and the last update content is a modification (#49: No), processing is performed that integrates the update data as one piece of modification update data for performing an update that modifies that particular data unit DU (#52). In the road data example of the present embodiment, as described above, processing is performed to generate modification update data that is constituted from the processing identification code; all data items except for the intersection IDs of the last update data that is the modification update data; and the merged update yes/no flag (#52).

Processing is then performed that adds the update data from the integration processing described above to a temporary integrated data file that will ultimately become the integrated data file for the processing section (#53).

However, if there is not a plurality of versions and only one version of the update data exists for the processing identification code (#46: No), the integration processing described above is not performed, and instead processing is performed that adds the one version of update data to the temporary integrated data file (#53).

If there are any unprocessed identification codes remaining after integration processing of the set processing identification code is ended (#54: Yes), the routine returns to #45 and one unprocessed identification code is set as the processing identification code. The integration processing described above is then performed for the set processing identification code, and integrated update data is generated and added to the temporary integrated data file. This recursive integration processing is repeatedly executed for the set processing section until there are no unprocessed identification codes left. Integrated update data for all identification codes that must be supplied for the set processing section is stored in the temporary integrated data file. Processing is subsequently performed that stores, in an integrated data file for the set processing section, the temporary integrated data file that completely stores the update data for all identification codes that must be supplied (#55). At such time, if the processed update data file was extracted by the request update data extraction unit 10, the temporary integrated data file is stored in the request update integrated data file 33. However, if the processed update data file was extracted by the safeguard update data extraction unit 11, the temporary integrated data file is stored in the safeguard update integrated data file 34. Thereafter, the temporary integrated data file is reset in order to store data for the next set processing section (#56).

If there are any unprocessed update sections remaining after integration processing of the set processing section is ended (#57: Yes), the routine returns to #41 and one unprocessed update section is set as the processing section. The integration processing described above is then performed for the set processing section, and after integration the temporary integrated data file is generated and stored in the integrated data file for the set processing section. This recursive integration processing is repeatedly executed for all the update sections until there are no unprocessed update sections left, and the request update integrated data file 33 or the safeguard update integrated data file 34 is generated for all the update sections that must be supplied.

3-5. Processing Performed by Database Update Unit 7

Figure 20:
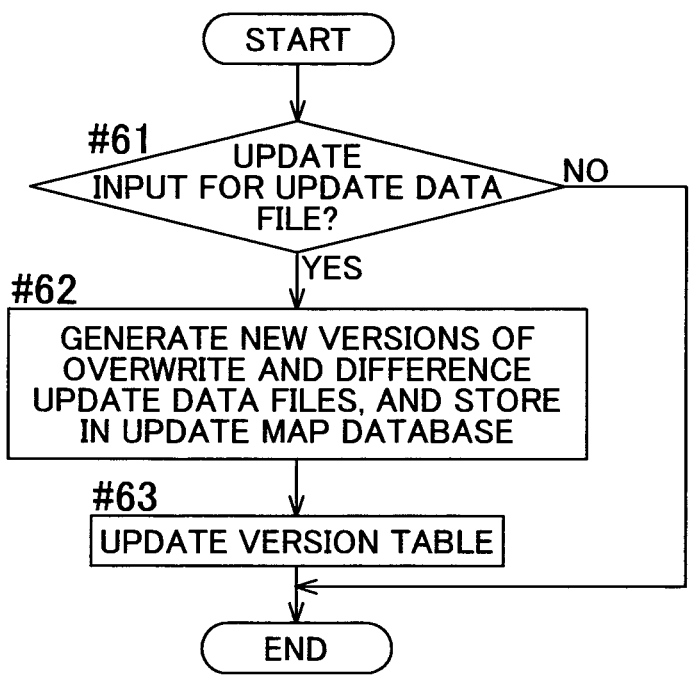
FIG. 20 is a flowchart that shows processing performed by a database update unit.

FIG. 20 is a flowchart that shows processing performed by the database update unit 7 to update the overwrite update data file Mc, the difference update data file Ma, and the version table VT stored in the update database DB1. As shown in FIG. 20, the database update unit 7 determines whether there is update input through the input device 4 that adds, modifies, or deletes map information in order to upgrade the versions of the overwrite update data file Mc and the difference update data file Ma (#61). If there is update input (#61: Yes), based on the content of the update input, the map update data supply device 1 uses the database update unit 7 to update the overwrite update data file Mc already stored in the update map database DB1 per section p to a new version, and generate a new version of the difference update data file Ma for difference updating per section p. These update data files are additionally stored in the update map database DB1 (#62).

Using the updated overwrite update data file Mc and the generated new version of the difference update data file Ma, the database update unit 7 performs processing to update the latest version of the generated section p stored in the version table VT (#63).

3-6. Processing Performed by Version Table Update Unit 8

Figure 21:
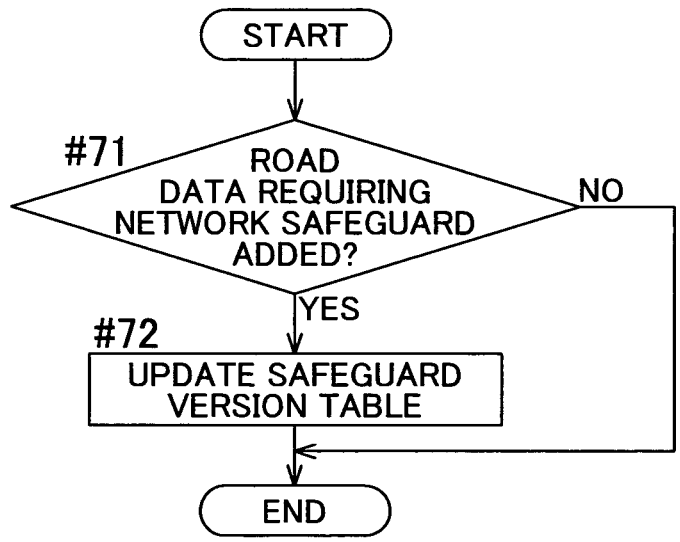
FIG. 21 is a flowchart that shows processing performed by a version table update unit.

FIG. 21 is a flowchart that shows processing performed by the version table update unit 8 to update the safeguard version table SVT.

As shown in FIG. 21, if the database update unit 7 generates new versions of the overwrite update data file Mc and the difference update data file Ma requiring a network safeguard for two adjacent sections p as described above (#71: Yes), the version table update unit 8 performs processing to associate the new versions, as the safeguard versions va of the adjacent sections p, with the section group g formed of the two adjacent sections p, and cumulatively record these in the safeguard version table SVT (#72).

3-7. Processing Performed by Management Database Update Unit 9

Figure 22:
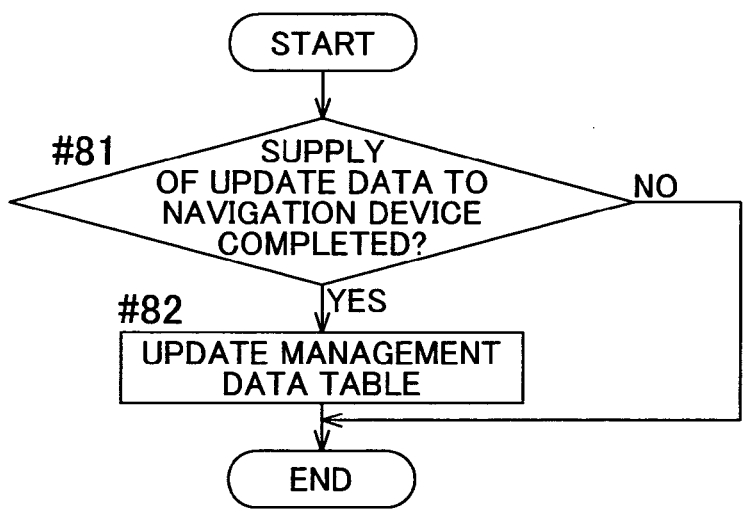
FIG. 22 is a flowchart that shows processing performed by a management database update unit.

FIG. 22 is a flowchart that shows processing performed by the management database update unit 9 to update a plurality of management data tables DT that is stored in the management database DB2 and corresponds to each navigation device 2.

As shown in FIG. 22, if supply of the first supply data file fa1 and the second supply data file fa2 to the navigation device 2 is completed as described above (#81: Yes), the management database update unit 9 performs processing to update the current version that is the latest update version of the section p in the management data table DT provided per navigation device 2, using the update version of the section p in the supplied first supply data file fa1 and second supply data file fa2 (#82).

4. Operation Processing for Map Updating in Navigation Device 2

Next, the processing of the navigation device 2 that is operated in accordance with the map data update program will be described based on a flowchart. Here, when updating the map data Mb stored in the map database DB3, the navigation device 2 uses the update request generation unit 48 to generate the update request fb and transmit the update request fb to the map update data supply device 1. The navigation device 2 subsequently acquires the first supply data file fa1 and the second supply data file fa2, which are generated by the map update data supply device 1 after receiving the update request fb. Based on the first supply data file fa1 and the second supply data file fa2, the navigation device 2 updates the map data Mb.

Figure 23:
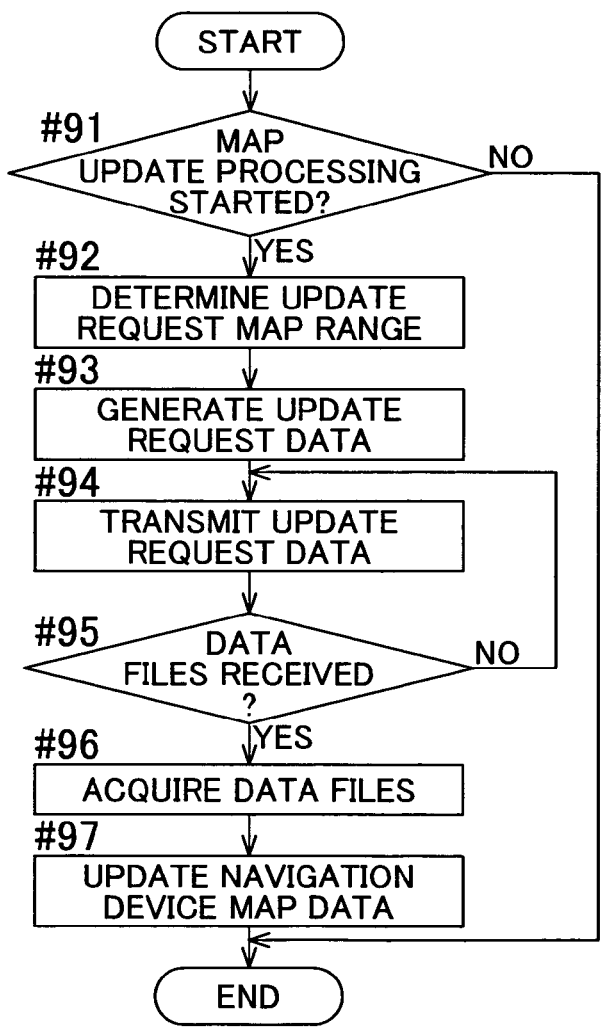
FIG. 23 is a flowchart that shows operation processing for map updating in the navigation device.

Specifically, as shown in FIG. 23, the navigation device 2 determines whether the map update processing has started (#91). The map update processing is started, for example, if the navigation device 2 regularly performs the map update processing at a preset timing, if the map data Mb is referenced by the navigation computation unit 27 in a manner that satisfies a prescribed condition, or if there is a request operation to start the map update processing from the user of the navigation device 2.

If the map update processing is started (#91: Yes), the navigation device 2 uses the update request generation unit 48 to perform processing that determines the update request map range 51 to be transmitted to the map update data supply device 1 as described above (#92), and generates the update request fb that is constituted from the update request map range 51 and the identification information (#93). Next, the navigation device 2 uses the communication control unit 50 to control the communication device 46 so as to transmit the update request fb generated at #93 to the map update data supply device 1 (#94). In the map update data supply device 1, after receiving the update request fb, processing is performed to generate the first supply data file fa1 and the second supply data file fa2 as described above, and supply these data files to the navigation device 2. If the navigation device 2 does not receive the first supply data file fa1 and the second supply data file fa2 from the map update data supply device 1 before the elapse of a prescribed time (#95: No), the navigation device 2 determines a communication abnormality and transmits the update request fb again (#94).

If the navigation device 2 receives the first supply data file fa1 and the second supply data file fa2 from the map update data supply device 1 (#95: Yes), the first supply data file fa1 and the second supply data file fa2 are acquired (#96). The navigation device 2 then uses the map data update unit 49 to perform an overwrite or difference update of the map data Mb based on the first supply data file fa1 and the second supply data file fa2 (#97). In the present example, as described above, the first supply data file fa1 and the second supply data file fa2 are update data files for overwrite or difference updating the update section, wherein the update section is constituted from the request update section 23 that is set based on the update request map range 51, and the safeguard update section 24 that is used for network safeguarding. Therefore, the map data update unit 49 updates the map data Mb at #97 by updating the map data of the section p corresponding to the update section in the layer 1 of the main map data Mb1 of the map data Mb, wherein the section p for which the first supply data file fa1 and the second supply data file fa2 are update data files for difference updating is difference updated based on the update data for difference updating, and the section p for which the first supply data file fa1 is an update date file for overwrite updating is overwrite updated by the update data file for overwrite updating. After performing the above, the operation processing for map updating in the navigation device 2 is ended.

The present invention may be utilized in a map update data supply device and a map update data supply program, which supply data for updating map data to a navigation device having map data.

The invention claimed is:

1. A map update data supply device that supplies data for updating a map database to a navigation device that has the map database, with the map database including at least road network information and divided into a plurality of sections, the map update data supply device comprising:
   an update map database that manages per section versions of an update data file of the map database, and stores per section an overwrite update data file that is an update data file for overwrite updating to a latest version, has the same format as the map database has, and includes all data constituting a map within a section as the map database includes, and a difference update data file that is an update data file for difference updating to a particular version;
   a request update data extraction unit that, based on an update request from the navigation device, extracts a request update section that includes at least one of the sections of the road network data subjected to an overwrite update, and extracts for each section of the road network data in the request update section the overwrite update data file as a first supply data file that is a data file to be supplied to the navigation device;
   a safeguard update data extraction unit that extracts a safeguard update section that includes sections of the road network data adjacent to the request update section and which require a difference update to safeguard road network connections between the request update section and the sections of the road network included in the safeguard update section, and extracts for each section of the road network data in the safeguard update section the difference update data file up to an update safeguard version, which is a version requiring a difference update to safeguard the road network connection, as a second supply data file that is a data file to be supplied to the navigation device, wherein, for each particular difference update data file of all of the difference update files for a particular section of the road network data in the safeguard update section that are between a version of the overwrite update data file and a current version of the safeguard update section:
      when the particular difference update data file is a version in which a road that spans between the request update section and the safeguard update section is newly added, the particular difference update data file is supplied as part of the second supply data file; and
      when the particular difference update data file is a version in which a road does not span between the request update section and the safeguard update section, the particular difference update data file is not supplied as part of the second supply data file; and
   a data supply unit that supplies to the navigation device the first supply data file for each section of the road network data in the request update section extracted by the request update data extraction unit, and the second supply data file for each safeguard update section extracted by the safeguard update data extraction unit.

2. The map update data supply device according to claim 1, wherein
   the request update data extraction unit extracts up to the latest version of the difference update data file for each section of the road network data in the request update section,
   an update time determination unit is further provided that compares the overwrite update data file and up to the latest version of the difference update data file for each section of the road network data in the request update section to determine which carries a shorter update time, and the request update data extraction unit, if the update time determination unit determines that the update time carried by up to the latest version of the difference update data file for a particular section of the road network data in the request update section is shorter than the update time carried by the overwrite update data file, extracts for the particular section of the road network data in the request update section up to the latest version of the difference update data file in place of the overwrite update data file as the first supply data file.

3. The map update data supply device according to claim 1, wherein the data supply unit comprises at least two selectable data supply methods whose communication costs differ depending on a volume of data, and the request update data extraction unit, if the data supply method with the higher communication cost is selected, extracts up to the latest version of the difference update data file in place of the overwrite update data file as the first supply data file.

4. The map update data supply device according to claim 2, further comprising:

an integrated data generation unit that integrates per request update section up to the latest version of all the difference update data files for each section of the road network data in the request update section extracted by the request update data extraction unit, and generates a request update integrated data file that serves as a data file for one difference update, wherein the update time determination unit performs processing such that an update time carried by the request update integrated data file is used for comparison in place of up to the latest version of the difference update data file, and the request update data extraction unit performs processing such that the request update integrated data file is extracted in place of up to the latest version of the difference update data file as the first supply data file.

5. The map update data supply device according to claim 1, further comprising:

an integrated data generation unit that integrates up to the update safeguard version of all the difference update data files for each section of the road network data in the safeguard update section extracted by the safeguard update data extraction unit, and generates a safeguard update integrated data file that serves as a data file for one difference update, wherein the safeguard update data extraction unit extracts the safeguard update integrated data file in place of up to the update safeguard version of all the difference update data files as the second supply data file.

6. The map update data supply device according to claim 1, further comprising:

a version table that stores, as a safeguard version and associated with a section group that is a combination of a section and a section adjacent thereto in the update map database, a version of the difference update data file for a section when safeguarding of a road network connection between the sections that constitute the section group is required, wherein the safeguard update data extraction unit extracts the safeguard update section based on the version table, the request update section and the latest version of each section of the road network data in the request update section, and acquires information on the update safeguard version for each section of the road network data in the safeguard update section to extract up to the update safeguard version of the difference update data file.

7. A non-transitory computer-readable storage medium storing a computer-executable map update data supply program that supplies data for updating a map database to a navigation device that has the map database, with the map database including at least road network information and divided into a plurality of sections, the map update data supply program comprising:

instructions for using an update map database that manages per section versions of an update data file of the map database, and stores per section an overwrite update data file that is an update data file for overwrite updating to a latest version, has the same format as the map database has, and includes all data constituting a map within a section as the map database includes, and a difference update data file that is an update data file for difference updating to a particular version;

instructions for extracting, based on an update request from the navigation device, extracts a request update section that includes at least one of the sections of the road network data subjected to an overwrite update, and extracts for each section of the road network data in the request update section the overwrite update data file as a first supply data file that is a data file to be supplied to the navigation device;

instructions for extracting extracts a safeguard update section that includes sections of the road network data adjacent to the request update section and which require a difference update to safeguard road network connections between the request update section and the sections of the road network included in the safeguard update section, and extracts for each section of the road network data in the safeguard update section the difference update data file up to an update safeguard version, which is a version requiring a difference update to safeguard the road network connection, as a second supply data file that is a data file to be supplied to the navigation device, wherein, for each particular difference update data file of all of the difference update files for a particular section of the road network data in the safeguard update section that are between a version of the overwrite update data file and a current version of the safeguard update section:

when the particular difference update data file is a version in which a road that spans between the request update section and the safeguard update section is newly added, the particular difference update data file is supplied as part of the second supply data file; and when the particular difference update data file is a version in which a road does not span between the request update section and the safeguard update section, the particular difference update data file is not supplied as part of the second supply data file; and instructions for supplying to the navigation device the first supply data file for each section of the road network data in the request update section, and the second supply data file for each safeguard update section.

* * * * *